US008554968B1

(12) United States Patent
Onufryk et al.

(10) Patent No.: US 8,554,968 B1
(45) Date of Patent: Oct. 8, 2013

(54) INTERRUPT TECHNIQUE FOR A NONVOLATILE MEMORY CONTROLLER

(75) Inventors: Peter Z. Onufryk, Flanders, NJ (US); Jayesh Patel, San Jose, CA (US); Ihab Jaser, San Jose, CA (US)

(73) Assignee: PMC-Sierra, Inc., Sunnyvale, CA (US)

( * ) Notice: Subject to any disclaimer, the term of this patent is extended or adjusted under 35 U.S.C. 154(b) by 261 days.

(21) Appl. No.: 13/052,388

(22) Filed: Mar. 21, 2011

Related U.S. Application Data

(60) Provisional application No. 61/374,242, filed on Aug. 16, 2010.

(51) Int. Cl.
*G06F 13/24* (2006.01)

(52) U.S. Cl.
USPC .............................. 710/260; 710/48; 710/269

(58) Field of Classification Search
USPC ...................... 710/48, 50, 260, 269; 711/156
See application file for complete search history.

(56) References Cited

U.S. PATENT DOCUMENTS 5,875,343 A * 2/1999 Binford et al. ................ 710/263
7,620,784 B2 11/2009 Panabaker
7,708,195 B2 5/2010 Yoshida et al.
8,244,946 B2 * 8/2012 Gupta et al. .................. 710/263
2008/0256280 A1 * 10/2008 Ma ............................... 710/263
2008/0320214 A1 12/2008 Ma et al.
2009/0077302 A1 3/2009 Fukuda
2010/0185808 A1 7/2010 Yu et al.
2010/0262979 A1 10/2010 Borchers et al.
2011/0161678 A1 6/2011 Niwa

OTHER PUBLICATIONS

NVM Express, Revision 1.0b; Intel Corporation; pp. 103-106 and 110-114; Jul. 12, 2011.*
NVM Express, Revision 1.0; Intel Corporation; Mar. 1, 2011.

* cited by examiner

*Primary Examiner* — Glenn A Auve
(74) *Attorney, Agent, or Firm* — Kenneth Glass; Stanley J. Pawlik; Glass & Associates

(57) ABSTRACT

A nonvolatile memory controller processes a nonvolatile memory command and generates a completion status for the nonvolatile memory command. The nonvolatile memory controller transmits the completion status to a host processing unit for storage in a completion queue of the host processing unit. An interrupt manager in the nonvolatile memory controller determines the completion queue contains an unprocessed completion status and generates an interrupt message packet. The nonvolatile memory controller transmits the interrupt message packet to the host processing unit for triggering an interrupt in the host processing unit and alerting the host processing unit to the unprocessed completion status.

19 Claims, 17 Drawing Sheets

100
105 Nonvolatile Memory Controller
110 Host Processing Unit
115 Communication Network
120 Host Controller Interface
125 Network Module
130 Control Module
300 Storage Controller
140 NVM Storage Device
145 Processor Module
150 Processor
160 Controller Memory
315 Buffer Memory
320 Memory Module (optional)
325 Memory Interface (optional)

INTERRUPT TECHNIQUE FOR A NONVOLATILE MEMORY CONTROLLER

CROSS-REFERENCE TO RELATED APPLICATION

This application claims benefit of U.S. provisional patent application Ser. No. 61/374,242 filed Aug. 16, 2010 and entitled "Non Volatile Memory Host Controller Interface Device," which is incorporated herein by reference in its entirety.

BACKGROUND

Nonvolatile Memory Express (NVMe) is a standard defining a register interface, command set, and feature set for high-performance Peripheral Component Interconnect Express (PCIe) based solid-state drives (SSDs). An NVMe interface includes a register interface defined by the NVMe standard and allows a host computer to communicate with a non-volatile memory subsystem such as a Flash storage device. Typically, the NVMe interface is implemented as a stand-alone Peripheral Component Interconnect (PCI) device.

In a typical computing system including an NVMe interface, a host computer provides nonvolatile memory commands to a non-volatile memory subsystem including the NVMe interface. In turn, the NVMe interface processes the nonvolatile memory commands to manage data in a non-volatile memory device of the non-volatile memory subsystem. Although the NVMe standard specifies a register set and a standard command set for designing an NVMe interface, the NVMe standard leaves other implementation details open to a designer of the non-volatile memory subsystem.

SUMMARY

In various embodiments, a nonvolatile memory controller includes a processor and an interrupt manager. The processor processes a nonvolatile memory command. Additionally, the processor generates a completion status based on the nonvolatile memory command for storage of the completion status in a completion queue of a host processing unit. The interrupt manager determines the completion queue in the host processing unit includes an unprocessed completion status. Further, the interrupt manager generates an interrupt message packet for triggering an interrupt in the host processing unit. In this way, the nonvolatile memory controller alerts the host processing unit to the unprocessed completion status in the completion queue. Because the interrupt manager alerts the host processing unit of the unprocessed completion status in the completion queue, the host processing unit need not include resources for monitoring the completion queue for an unprocessed completion status.

A nonvolatile memory controller, in accordance with one embodiment, includes an interrupt manager. The interrupt manager is configured to determine a completion queue in a host processing unit contains an unprocessed completion status. The interrupt manager is further configured to generate a completion queue state for indicating the occurrence of a completion queue event associated with the completion queue, generate an interrupt vector state based on the completion queue state, determine the completion queue of the host processing unit contains an unprocessed completion status based on the interrupt vector state, and generate an interrupt message packet for triggering an interrupt in the host processing unit to alert the host processing unit of the unprocessed completion status in the completion queue.

A nonvolatile memory controller, in accordance with one embodiment, includes a completion queue state memory, an interrupt vector state memory, and an interrupt manager controller. The interrupt manager controller is coupled to the completion queue state memory and the interrupt vector state memory. The completion queue state memory is configured to store completion queue states corresponding to completion queues in a host processing unit. The interrupt vector state memory is configured to store interrupt vector states corresponding to interrupt vectors in the host processing unit. The interrupt manager controller is configured to map at least one of the completion queue states to an interrupt vector state. The interrupt manager is further configured to generate the interrupt vector state based on each completion queue state mapped to the interrupt vector state. Additionally, the interrupt manager controller is configured to determine a completion queue corresponding to a completion queue state mapped to the interrupt vector state includes an unprocessed completion status based on the interrupt vector state. Further, the interrupt manager controller is configured to generate an interrupt message packet for triggering an interrupt in the host processing unit to alert the host processing unit of the unprocessed completion status in the completion queue.

A method, in accordance with one embodiment, includes generating a completion queue state by a nonvolatile memory controller for indicating the occurrence of a completion queue event associated with a completion queue in a host processing unit. The method further includes generating an interrupt vector state by the nonvolatile memory controller based on the completion queue state. The interrupt vector state is associated with an interrupt vector in the host processing unit. Additionally, the method includes determining by the nonvolatile memory controller based on the interrupt vector state that the completion queue contains an unprocessed completion status. The method also includes generating an interrupt message packet by the nonvolatile memory interface for triggering an interrupt in the host processing unit to alert the host processing unit of the unprocessed completion status in the completion queue.

BRIEF DESCRIPTION OF THE DRAWINGS

The accompanying drawings are included to provide a further understanding of the invention, and are incorporated in and constitute a part of this specification. The drawings illustrate embodiments of the invention, and together with the description, serve to explain the principles of the invention.

DETAILED DESCRIPTION

In various embodiments, a nonvolatile memory controller includes an interrupt manager that identifies a completion queue containing an unprocessed completion status in a host processing unit. The interrupt manager generates an interrupt message packet for generating an interrupt in the host processing unit. Moreover, the interrupt is associated with the completion queue containing the unprocessed completion status. In this way, the interrupt manager alerts the host processing unit to the unprocessed completion status in the completion queue.

Figure 1:
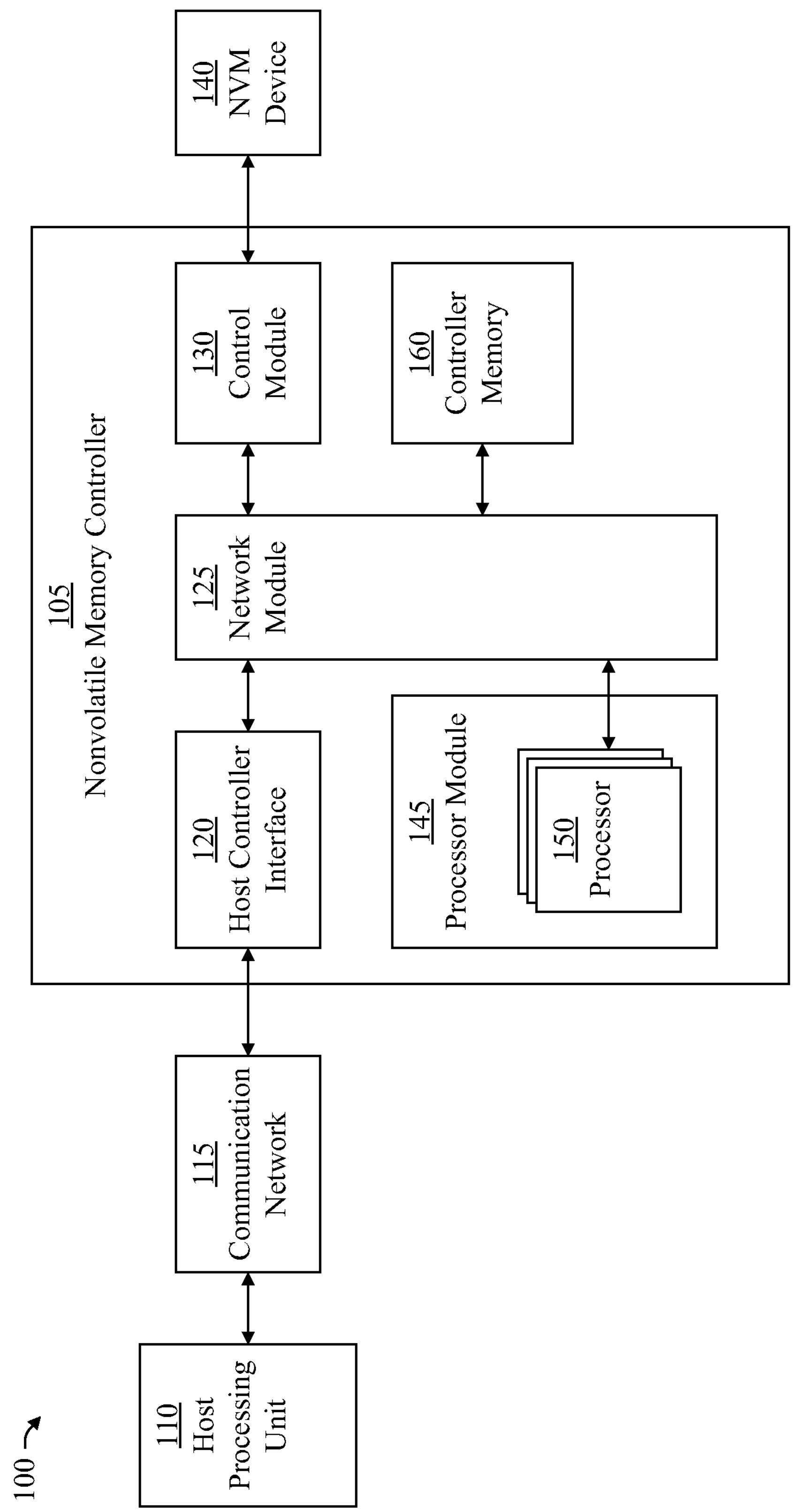
FIG. 1 is a block diagram of a computing system, in accordance with an embodiment of the present invention.

FIG. 1 illustrates a computing system 100, in accordance with an embodiment of the present invention. The computing system 100 includes a host processing unit 110, a communication network 115, a nonvolatile memory controller 105, and a nonvolatile memory device 140. The communication network 115 is coupled (e.g., connected) to the host processing unit 110 and the nonvolatile memory controller 105. Additionally, the nonvolatile memory controller 105 is coupled (e.g., connected) to the nonvolatile memory device 140. In various embodiments, the nonvolatile memory device 140 is a flash storage device and the nonvolatile memory controller 105 is a flash controller.

In various embodiments, the computing system 100 is a desktop computer, a server, a computer workstation, or the like. In some embodiments, the computing system 100 is a portable electronic device, such as a portable computer, a mobile phone, a digital camera, a media player, a personal digital assistant, a pager, a global positioning system, or the like.

The communication network 115 facilitates communication between the host processing unit 110 and the nonvolatile memory controller 105. For example, the communication network 115 may be a packet communication network, such as a Peripheral Component Interconnect Express (PCIe) network. The nonvolatile memory controller 105 manages data stored in the nonvolatile memory device 140 and communicates with the host processing unit 110 through the communication network 115 for transferring data between the host processing unit 110 and the nonvolatile memory device 140. In various embodiments, the nonvolatile memory controller 105 processes nonvolatile memory commands generated by the host processing unit 110 for controlling operation of the nonvolatile memory controller 105. In some embodiments, the host processing unit 110 generates Enterprise Non-Volatile Memory Host Control Interface (eNVMHCI) commands from the host processing unit 110 and the nonvolatile memory controller 105 processes the eNVMHCI commands to manage operation of the nonvolatile memory controller 105.

In various embodiments, the nonvolatile memory controller 105 includes a host controller interface 120, a network module 125, a control module 130, a processor module 145, and a controller memory 160. The network module 125 is coupled (e.g., connected) to the host controller interface 120, the control module 130, the processor module 145, and the controller memory 160. Additionally, the host controller interface 120 is coupled (e.g., connected) to the communication network 115, and the control module 130 is coupled (e.g., connected) to the nonvolatile memory device 140. Furthermore, the processor module 145 includes processors 150 coupled (e.g., connected) to the network module 125. In these embodiments, each of the host controller interface 120, the control module 130, the processors 150, and the controller memory 160 is a functional unit of the nonvolatile memory controller 105.

In various embodiments, each of the host controller interface 120, the control module 130, the processor module 145, and the controller memory 160 is source node or a destination node of the nonvolatile memory controller 105. In this way, each functional unit of the nonvolatile memory controller 105 may be a source node or a destination node. In some embodiments, one or more of the host controller interface 120, the control module 130, the processor module 145, and the controller memory 160 is both a source node and a destination node of the nonvolatile memory controller 105. In this way, a functional unit of the nonvolatile memory controller 105 may be both a source node and a destination node.

The host controller interface 120 facilitates communication between the communication network 115 and the functional units of the nonvolatile memory controller 105 through the network module 125. The control module 130 manages data in the nonvolatile memory device 140. For example, the control module 130 may read data from the nonvolatile memory device 140 and write data into the nonvolatile memory device 140.

The controller memory 160 stores data being transferred from the host processing unit 110 to the nonvolatile memory device 140. Additionally, the controller memory 160 stores data being transferred from the nonvolatile memory device 140 to the host processing unit 110. In this way, the controller memory 160 is an intermediate storage location for temporarily storing data being transferred between the host processing unit 110 and the nonvolatile memory device 140. In various embodiments, the controller memory 160 includes a random access memory (RAM), such as a static random access memory (SRAM) or a dynamic random access memory (DRAM).

In various embodiments, the host processing unit 110 generates nonvolatile memory commands and stores the nonvolatile memory commands in one or more submission queues contained in the host processing unit 110. The host controller interface 120 determines that a submission queue in the host processing unit 110 contains a nonvolatile memory command, generates a request packet, and transmits the request packet to the host processing unit 110 through the communication network 115. In response to the request packet generated by the host controller interface 120, the host processing unit 110 generates a completion packet including a nonvolatile memory command contained in a submission queue and transmits the completion packet to the host controller interface 120 of the nonvolatile memory controller 105 through the communication network 115.

The host controller interface 120 retrieves the completion packet including the nonvolatile memory command, generates a request message packet including the nonvolatile memory command based on the request packet, and provides the request message packet to the network module 125. In turn, the network module 125 routes the request message packet to the processor module 145. The processor module 145 processes the nonvolatile memory command in the request message packet, generates a completion message packet including a completion status (e.g., a completion entry) based on the request message packet, and provides the completion message packet to the network module 125. The network module 125 routes the completion message packet to the host controller interface 120.

The host controller interface 120 generates a request packet including the completion status based on the completion message packet and transmits the request packet to the host processing unit 110 through the communication network 115. In turn, the host processing unit 110 stores the completion status of the request message packet received from the host controller interface 120 in a completion queue contained in the host processing unit 110. Additionally, the host processing unit 110 processes the completion status to determine the status of processing the nonvolatile memory command (i.e., a processing status).

In various embodiments, a processor module 145 processes the nonvolatile memory command in a request message packet by generating additional request message packets, each of which includes a command. The processor 150 provides the request message packets to the network module 125. In turn, the network module 125 routes each of the request message packets received from the processor module 145 to a functional unit of the nonvolatile memory controller 105 identified in the request message packet. In this way, the processor 150 functions as a source node and the functional unit receiving the request message packet functions as a destination node.

The functional unit receiving a request message packet from the processor 150 through the network module 125 processes the command in the request message packet, generates a completion message packet including a completion status based on the request packet, and provides the completion message packet to the network module 125. The completion status of the completion message packet indicates a status of the command processed by the functional unit (i.e., a processing status). The network module 125 routes the completion message packet to the processor 150.

In various embodiments, the processor module 145 processes the nonvolatile memory command in the request message packet received from the host controller interface 120 by generating a request message packet including a data transfer command for transferring data between the host processing unit 110 and the controller memory 160, and generating another request message packet including a data transfer command for transferring data between the controller memory 160 and the nonvolatile memory device 140. In this way, the processor module 145 generates request message packets for transferring data in a piecemeal manner between the host processing unit 110 and the nonvolatile memory device 140 based on the request message packet including the nonvolatile memory command.

In some cases, each functional unit receiving a request message packet from the processor module 145 generates one or more request data packets based on the request message packet. Each of the request data packets is a request for transferring data between functional units of the nonvolatile memory controller 105 through the network module 125 or transferring data between the host processing unit 110 and the host controller interface 120. For example, the control module 130 may generate request data packets and provide the request data packets to the network module 125 for routing to the controller memory 160. In this example, the controller memory 160 generates completion packets including data stored in the controller memory 160 and provides the completion packets to the network module 125 for routing to the control module 130.

In various embodiments, the nonvolatile memory controller 105 is implemented in an integrated circuit of an integrated circuit device which may include an integrated circuit package containing the integrated circuit. In some embodiments, the nonvolatile memory controller 105 is implemented in a single integrated circuit die. In other embodiments, the nonvolatile memory controller 105 is implemented in more than one integrated circuit die of an integrated circuit device which may include a multichip package containing the integrated circuit die.

In some embodiments, the host processing unit 110, the communication network 115, and the nonvolatile memory controller 105 are mounted to a printed circuit board. In these embodiments, the host processing unit 110 and the nonvolatile memory controller 105 are directly coupled to the communication network 115. For example, the host processing unit 110 and the nonvolatile memory controller 105 may be directly connected to the communication network 115 through wires in the printed circuit board.

Figure 2:
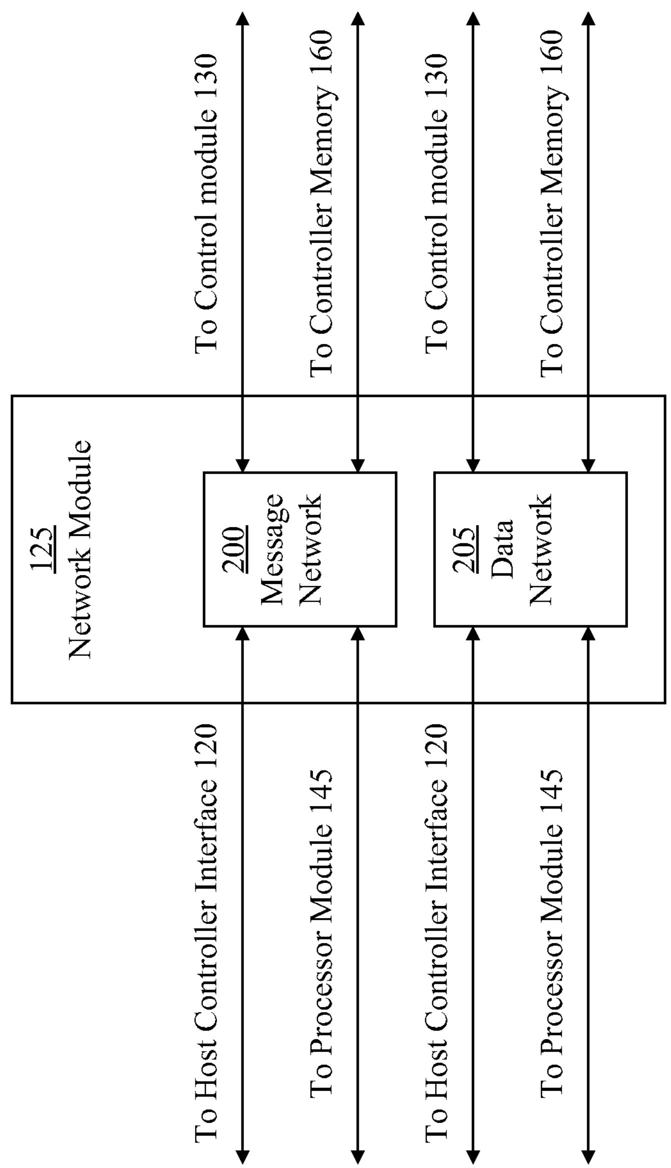
FIG. 2 is a block diagram of a network module, in accordance with an embodiment of the present invention.

FIG. 2 illustrates the network module 125, in accordance with an embodiment of the present invention. The network module 125 includes a message network 200 and a data network 205. Each of the message network 200 and the data network 205 is coupled (e.g., connected) to the host controller interface 120, the control module 130, the processor module 145, and the controller memory 160.

The message network 200 routes message packets, such as request message packets and completion message packets, between functional units of the nonvolatile memory controller 105. In various embodiments, the message network 200 routes message packets among functional units of the nonvolatile memory controller 105 by using an inter-processor communication (IPC) protocol.

The data network 205 routes data packets, such as data request packets and data completion packets, between functional units of the nonvolatile memory controller 105. In various embodiments, the data network 205 routes data packets among functional units of the nonvolatile memory controller 105 by using an inter-processor communication (IPC) protocol.

Figure 3:
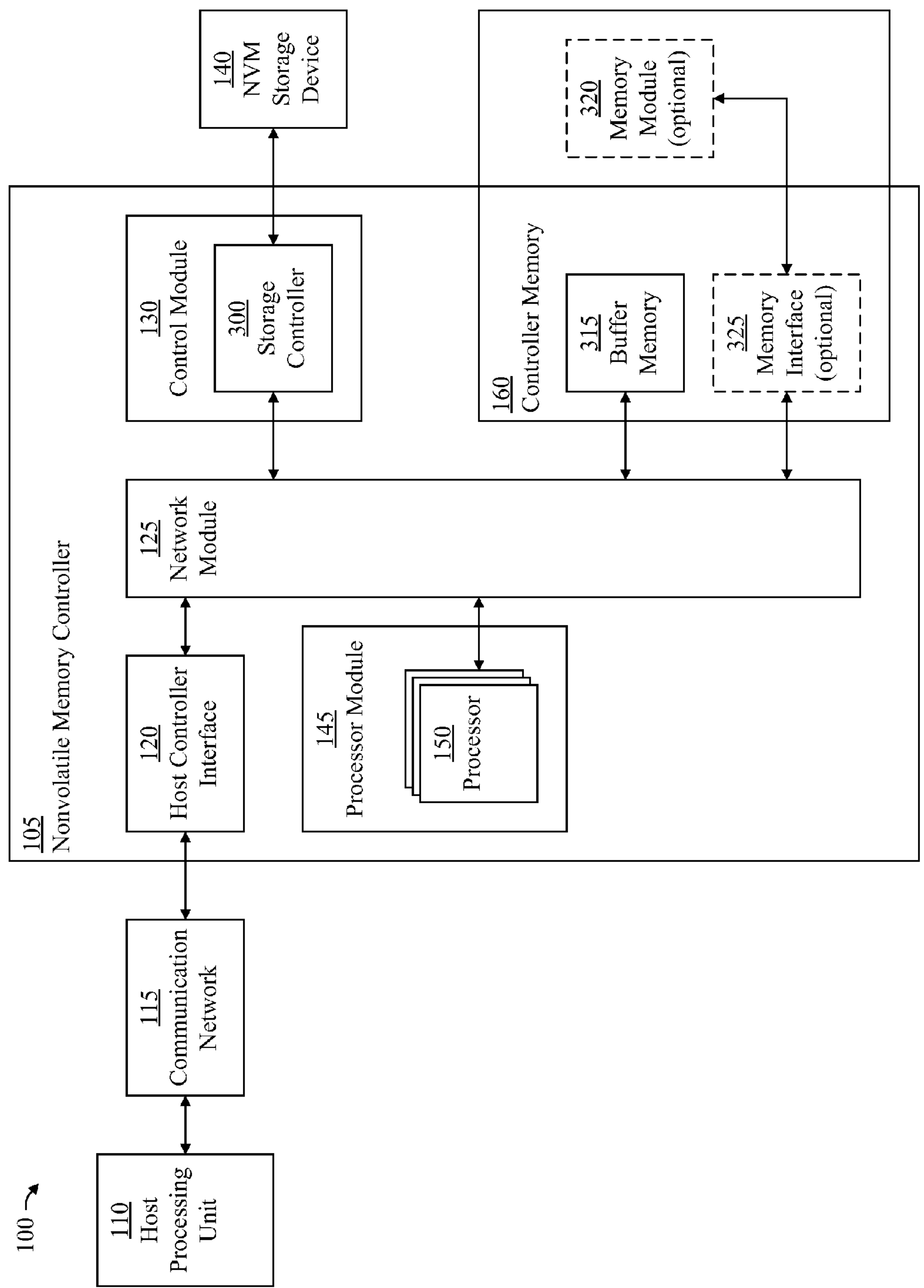
FIG. 3 is a block diagram of a computing system, in accordance with an embodiment of the present invention.

FIG. 3 illustrates a computing system 100, in accordance with an embodiment of the present invention. In this embodiment, the control module 130 includes a storage controller 300. The storage controller 300 is coupled (e.g., connected) to the network module 125 and the nonvolatile memory device 140. Furthermore, the controller memory 160 includes a buffer memory 315 coupled to the network module 125. Each of the storage controller 300 and the buffer memory 315 is a functional unit of the nonvolatile memory controller 105.

The storage controller 300 manages data in the nonvolatile memory device 140. For example, the storage controller 300 may read data from the nonvolatile memory device 140 and write data into the nonvolatile memory device 140. The buffer memory 315 stores data being transferred from the host processing unit 110 to the nonvolatile memory device 140. Additionally, the buffer memory 315 stores data being transferred from the nonvolatile memory device 140 to the host processing unit 110. In this way, the buffer memory 315 is a temporary storage location for data being transferred between the host processing unit 110 and the nonvolatile memory device 140. In various embodiments, the buffer memory 315 includes a random access memory (RAM), such as a static random access memory (SRAM).

In some embodiments, the controller memory 160 includes a memory interface 325 coupled (e.g., connected) to a memory module 320 external of the nonvolatile memory controller 105. For example, the nonvolatile memory controller 105 may be implemented in an integrated circuit and the memory module 320 may be implemented in another integrated circuit. In these embodiments, the controller memory 160 includes the memory interface 325 and the memory module 320 in addition to the buffer memory 315. Moreover, the memory interface 325 is a functional unit of the nonvolatile memory controller 105.

The memory interface 325 facilitates communication between the network module 125 and the memory module 320. The memory module 320 stores data being transferred from the host processing unit 110 to the nonvolatile memory device 140. Additionally, the memory module 320 stores data being transferred from the nonvolatile memory device 140 to the host processing unit 110. In this way, the memory module 320 is a temporary storage location for data being transferred between the host processing unit 110 and the nonvolatile memory device 140. In various embodiments, the memory module 320 includes a random access memory (RAM), such as a dynamic random access memory (DRAM).

In various embodiments, a processor 150 receives a request message packet including a nonvolatile memory command from the host controller interface 120 through the network module 125 and processes the nonvolatile memory command in the request message packet by generating additional request message packets, each of which includes a command. The processor 150 provides the request message packets generated by the processor 150 to the network module 125. In turn, the network module 125 routes each of the request message packets to a functional unit of the nonvolatile memory controller 105. Each of the functional units receiving a request message packet from the processor 150 through the network module 125 processes the command in the request message packet, generates a completion message packet based on the request message packet, and provides the completion message packet to the network module 125. The completion message packet includes a completion status indicating a processing status of the request message packet processed by the functional unit. The network module 125 routes the completion message packet to the processor 150.

In various embodiments, the processor 150 processes the nonvolatile memory command in the request message packet received from the host controller interface 120 by generating a request message packet including a data transfer command for transferring data between the host processing unit 110 and the controller memory 160, and generating another request message packet including a data transfer command (e.g., a flash command) for transferring data between the controller memory 160 and the nonvolatile memory device 140. For example, the processor 150 may generate a request message packet including a flash read command and a destination identifier that identifies the storage controller 300. In this example, the processor 150 provides the request message packet to the network module 125, and the network module 125 routes the request message packet to the storage controller 300 based on the destination identifier in a request message packet of the request message packet received from the processor 150. In turn, the storage controller 300 transfers the data from the nonvolatile memory device 140 to the buffer memory 315 based on the flash read command in the request message packet received from the processor 150.

Further in this example, the processor 150 generates a request message packet including a data transfer command and a destination identifier that identifies the host controller interface 120. In this example, the processor 150 provides the request message packet to the network module 125, and the network module 125 routes the request message packet to the host controller interface 120 based on the destination identifier. In turn, the host controller interface 120 transfers the data from the buffer memory 315 to the host processing unit 110 based on the data transfer command in the request message packet received from the processor 150.

As another example, the processor 150 may generate a request message packet including a data transfer command and a destination identifier that identifies the host controller interface 120. In this example, the processor 150 provides the request message packet to the network module 125, and the network module 125 routes the request message packet to the host controller interface 120 based on the destination identifier. In turn, the host controller interface 120 transfers the data from the host processing unit 110 to the buffer memory 315 based on the data transfer command in the request message packet received from the processor 150.

Further in this example, the processor 150 generates a request message packet including a flash write command and a destination identifier that identifies the storage controller 300. In this example, the processor 150 provides the request message packet to the network module 125, and the network module 125 routes the request message packet to the storage controller 300 based on the destination identifier in the request message packet. In turn, the storage controller 300 transfers the data from the buffer memory 315 to the nonvolatile memory device 140 based on the flash write command in the request message packet received from the processor 150.

Figure 4:
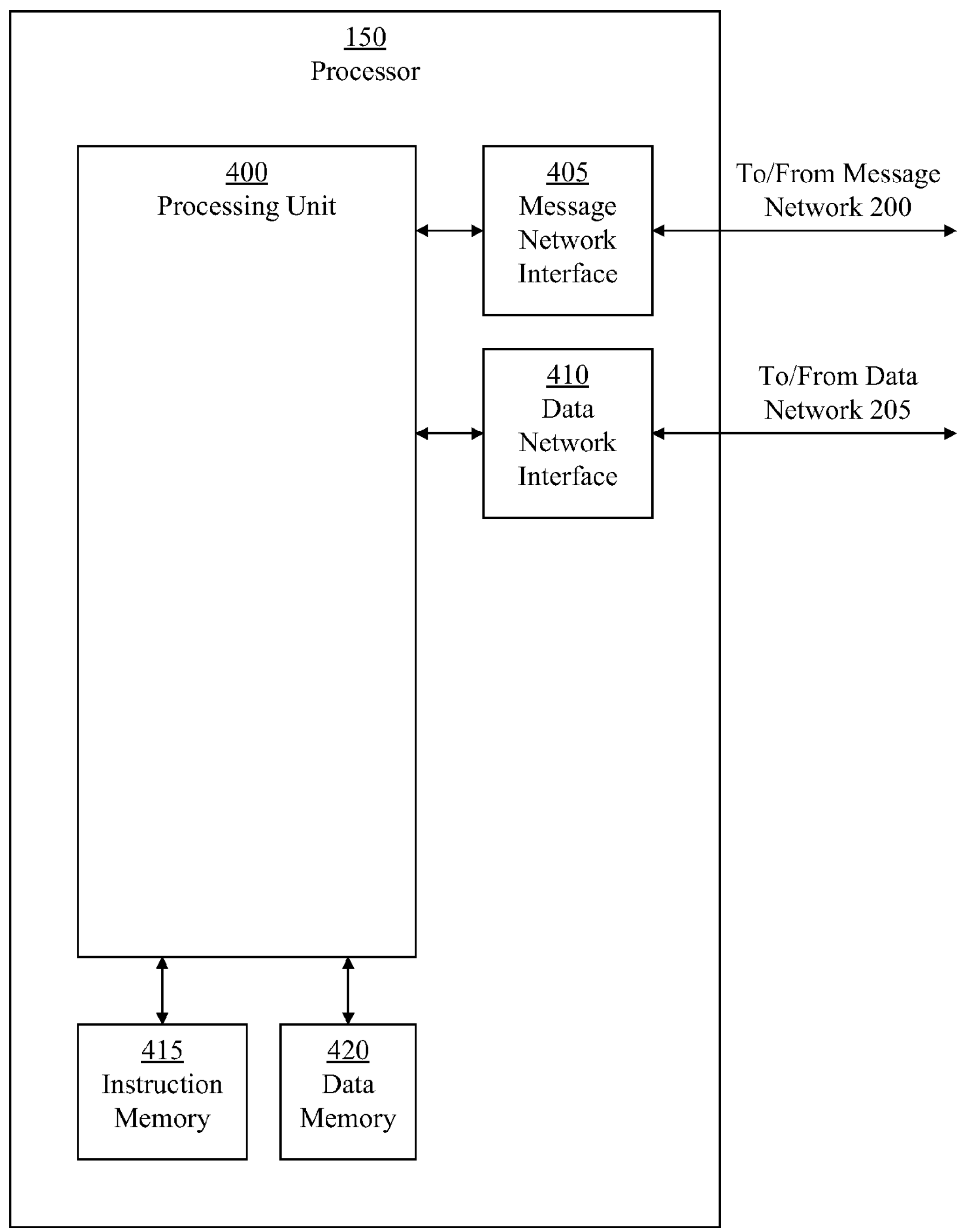
FIG. 4 is a block diagram of a processor, in accordance with an embodiment of the present invention.

FIG. 4 illustrates the processor 150, in accordance with an embodiment of the present invention. The processor 150 includes a processing unit 400, a message network interface 405, a data network interface 410, an instruction memory 415, and a data memory 420. The processing unit 400 is coupled (e.g., connected) to the message network interface 405, the data network interface 410, the instruction memory 415, and the data memory 420.

The message network interface 405 facilitates communication of message packets between the processing unit 400 and the message network 200. The data network interface 410 facilitates communication of data between the processing unit 400 and the data network 205. The instruction memory 415 stores computing instructions for the processing unit 400. The data memory 420 stores data for the processing unit 400. In various embodiments, the processing unit 400 receives a request message packet including a nonvolatile memory command from the host controller interface 120 through the message network interface 405 and writes data into the data memory 420 based on the nonvolatile memory command in the request message packet. For example, the processing unit 400 may write a nonvolatile memory command of the request message packet into the data memory 420. As another example, the processing unit 400 may write data contained in the request message packet into the data memory 420 based on the nonvolatile memory command.

Additionally, the processing unit 400 reads the data from the data memory 420 and provides the data to the data network 205 through the data network interface 410 for routing to the buffer memory 315. In this way, the processing unit 400 transfers the data received from the host controller interface 120 in the request message packet to the buffer memory 315. Alternatively, the processing unit 400 reads the data from the data memory 420 and provides the data to the data network 205 through the data network interface 410 for routing to the memory interface 325. In turn, the memory interface 325 writes the data into the memory module 320. In this way, the processing unit 400 transfers the data received from the host controller interface 120 in the request message packet to the memory module 320.

In various embodiments, the processors 150 in the processor module 145 function as a pool of processors, a pipeline of processors (i.e., a processor pipeline), or some combination thereof. In some embodiments, one of the processors 150 in the processor module 145 is a control processor. In these embodiments, the control processor boots the nonvolatile memory controller 105 and performs overall control and management functions in the nonvolatile memory controller 105. For example, the control processor may generate interrupt requests and process interrupt requests. In some embodiments, the processing unit 400 of the processor 150 implements a Tensilica LX2 32-bit instruction set developed by the Tensilica Corporation of Santa Clara, Calif.

Figure 5:
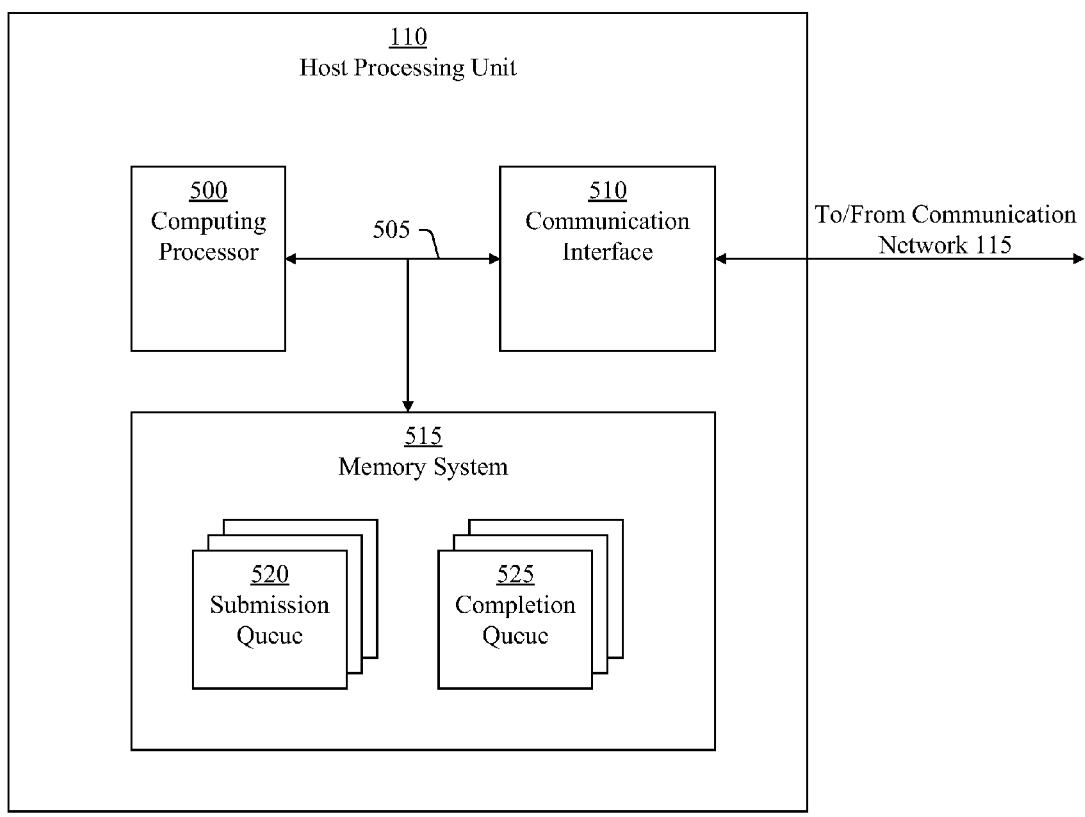
FIG. 5 is a block diagram of a host processing unit, in accordance with an embodiment of the present invention.

FIG. 5 illustrates the host processing unit 110, in accordance with an embodiment of the present invention. The host processing unit 110 includes a computing processor 500, a communication interface 510, and a memory system 515 coupled (e.g., connected) to each other through a computer bus 505. Moreover, the memory system 515 includes submission queues 520 and completion queues 525. The submission queues 520 store nonvolatile memory commands for controlling operation of the nonvolatile memory controller 105. The completion queues 525 store completion statuses corresponding to nonvolatile memory commands stored in the submission queues 520. In some embodiments, each of the completion queues 525 may be associated with one or more submission queues 520.

In various embodiments, the computing processor 500 generates nonvolatile memory commands for controlling the nonvolatile memory controller 105 and writes the nonvolatile memory commands into the submission queues 520. The nonvolatile memory controller 105 obtains the nonvolatile memory commands stored in the submission queues 520 and processes the nonvolatile memory commands to manage operation of the nonvolatile memory controller 105, as is described more fully herein. Further, the nonvolatile memory controller 105 generates completion statuses corresponding to the nonvolatile memory commands stored in the submission queues 520 and provides the completion statuses to the host processing unit 110 for storage in the completion queues 525. In this way, the nonvolatile memory controller 105 writes the completion statuses to the completion queues 525 in the host processing unit 110.

Figure 6:
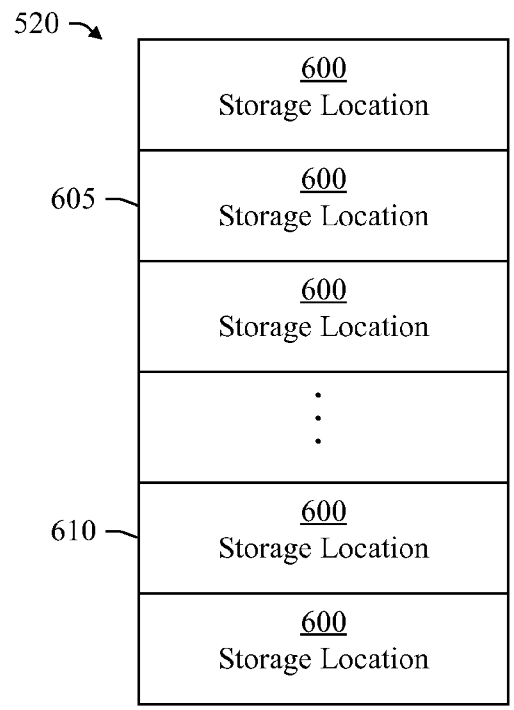
FIG. 6 is a block diagram of a submission queue, in accordance with an embodiment of the present invention.

FIG. 6 illustrates the submission queue 520, in accordance with an embodiment of the present invention. The submission queue 520 includes storage locations 600 for storing nonvolatile memory commands. In various embodiments, the submission queue 520 is a circular queue and includes a head 605 and a tail 610. For example, the submission queue 520 may include storage locations 600 of a PCIe memory in the memory system 515.

In operation, the computing processor 500 writes a nonvolatile memory command for controlling operation of the nonvolatile memory controller 105 to a storage location 600 at the tail 610 of the submission queue 520. Further, the computing processor 500 generates a write request packet including a tail pointer identifying the tail 610 of the submission queue 520. The host processing unit 110 transmits the write request packet to the nonvolatile memory controller 105 through the communication network 115. In this way, the host processing unit 110 writes the tail pointer to the nonvolatile memory controller 105 and updates a tail pointer stored in the nonvolatile memory controller 105 which also identifies the tail 610 of the submission queue 520.

The nonvolatile memory controller 105 determines the submission queue 520 contains at least one nonvolatile memory command based on the tail pointer stored in the nonvolatile memory controller 105 and based on a head pointer stored in the nonvolatile memory controller 105 that identifies the head 605 of the submission queue 520 stored in the host processing unit 110. Further, the nonvolatile memory controller 105 retrieves one or more nonvolatile memory commands from storage locations 600 starting at the tail 610 of the submission queue 520 and processes the nonvolatile memory commands, as is described more fully herein.

In various embodiments, the nonvolatile memory controller 105 initializes the head pointer stored in the nonvolatile memory controller 105 for identifying the head of the submission queue 520 to the tail pointer of the submission queue 520 received from the host processing unit 110. Further, the nonvolatile memory controller 105 updates the head pointer based on nonvolatile memory commands retrieved from the host processing unit 110, as is described more fully herein.

Figure 7:
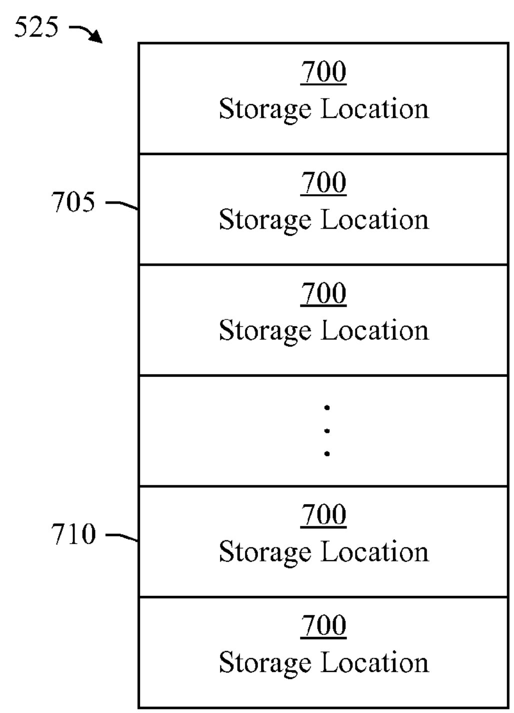
FIG. 7 is a block diagram of a completion queue, in accordance with an embodiment of the present invention.

FIG. 7 illustrates the completion queue 525, in accordance with an embodiment of the present invention. The completion queue 525 includes storage locations 700 for storing completion statutes. In various embodiments, the completion queue 525 is a circular queue and includes a head 705 and a tail 710. For example, the completion queue 525 may include storage locations 700 of a PCIe memory in the memory system 515.

In operation, the host processing unit 110 receives a request packet including a completion status from the host controller interface 120 through the communication network 115. The computing processor 500 writes the completion status into the storage location 700 at the tail 710 of the completion queue 525. Additionally, the host processing unit 110 reads completion statuses from storage locations 700 starting at the head 705 of the completion queue 525 to determine the status of the nonvolatile commands associated with the completion statuses that have been processed by the nonvolatile memory controller 105.

Further, the computing processor 500 generates a write request packet including a head pointer identifying the next storage location 700 at the head 705 of the completion queue 525 storing the next completion status. The host processing unit 110 transmits the write request packet to the nonvolatile memory controller 105 through the communication network 115. In this way, the host processing unit 110 writes the head pointer to the nonvolatile memory controller 105 and updates a head pointer stored in the nonvolatile memory controller 105 which also identifies the head 705 of the completion queue 525.

Figure 8:
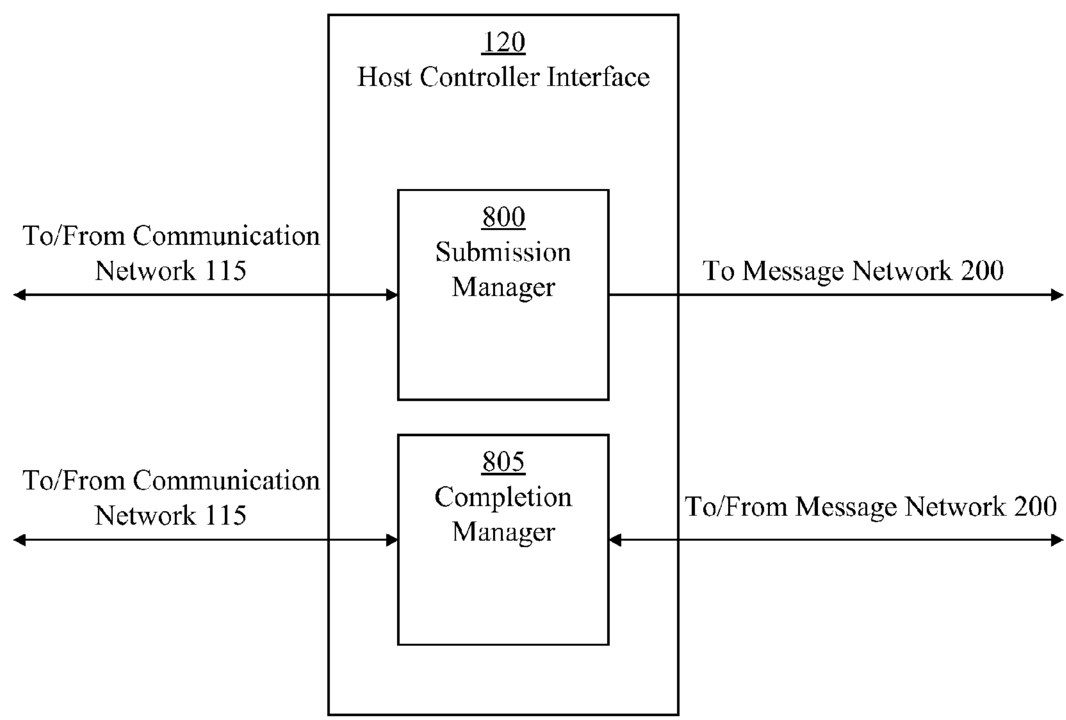
FIG. 8 is a block diagram of a host controller interface, in accordance with an embodiment of the present invention.

FIG. 8 illustrates the host controller interface 120, in accordance with an embodiment of the present invention. The host controller interface 120 includes a submission manager 800 and a completion manager 805. The submission manager 800 and the completion manager 805 are each coupled (e.g., connected) to the communication network 115 and the message network 200.

The submission manager 800 retrieves nonvolatile memory commands stored in the submission queues 520 of the memory system 515 in the host processing unit 110, generates request message packets based on the nonvolatile memory commands, and provides the request message packets to the message network 200 for routing to processors 150 of the nonvolatile memory controller 105. In various embodiments, the submission manager 800 retrieves a nonvolatile memory command stored in the memory system 515 of the host processing unit 110 by generating a request packet (e.g., a host memory read request packet), transmitting the request packet to the host processing unit 110 through the communication network 115, and receiving a completion packet containing the nonvolatile memory command from the host processing unit 110 through the communication network 115.

In some embodiments, the submission manager 800 retrieves nonvolatile memory commands stored in the submission queues 520 of the memory system 515 in the host processing unit 110 by retrieving the nonvolatile memory commands in parallel. In this way, the submission manager 800 retrieves the nonvolatile memory commands from the submission queues 520 substantially simultaneously.

The completion manager 805 receives completion message packets from processors 150 of the nonvolatile memory controller 105 through the message network 200, generates write request packets (e.g., memory write request packets) based on the completion message packets, and transmits the write request packets to the host processing unit 110 through the communication network 115. Moreover, the completion message packets each include a completion status associated with a nonvolatile memory command processed by a processor 150. The host processing unit 110 processes the write request packets including the completion statuses received from the completion manager 805 by storing the completion statuses into completion queues 525 of the host processing unit 110.

In some embodiments, the completion status indicates whether processing of the nonvolatile memory command by the nonvolatile memory controller 105 was a success or a failure. In these embodiments, the host controller interface 120 may perform additional operations based on the completion status in the completion message packet. For example, if the completion status indicates a failure then the host controller interface 120 may perform error recovery operations based on the completion message packet.

Figure 9:
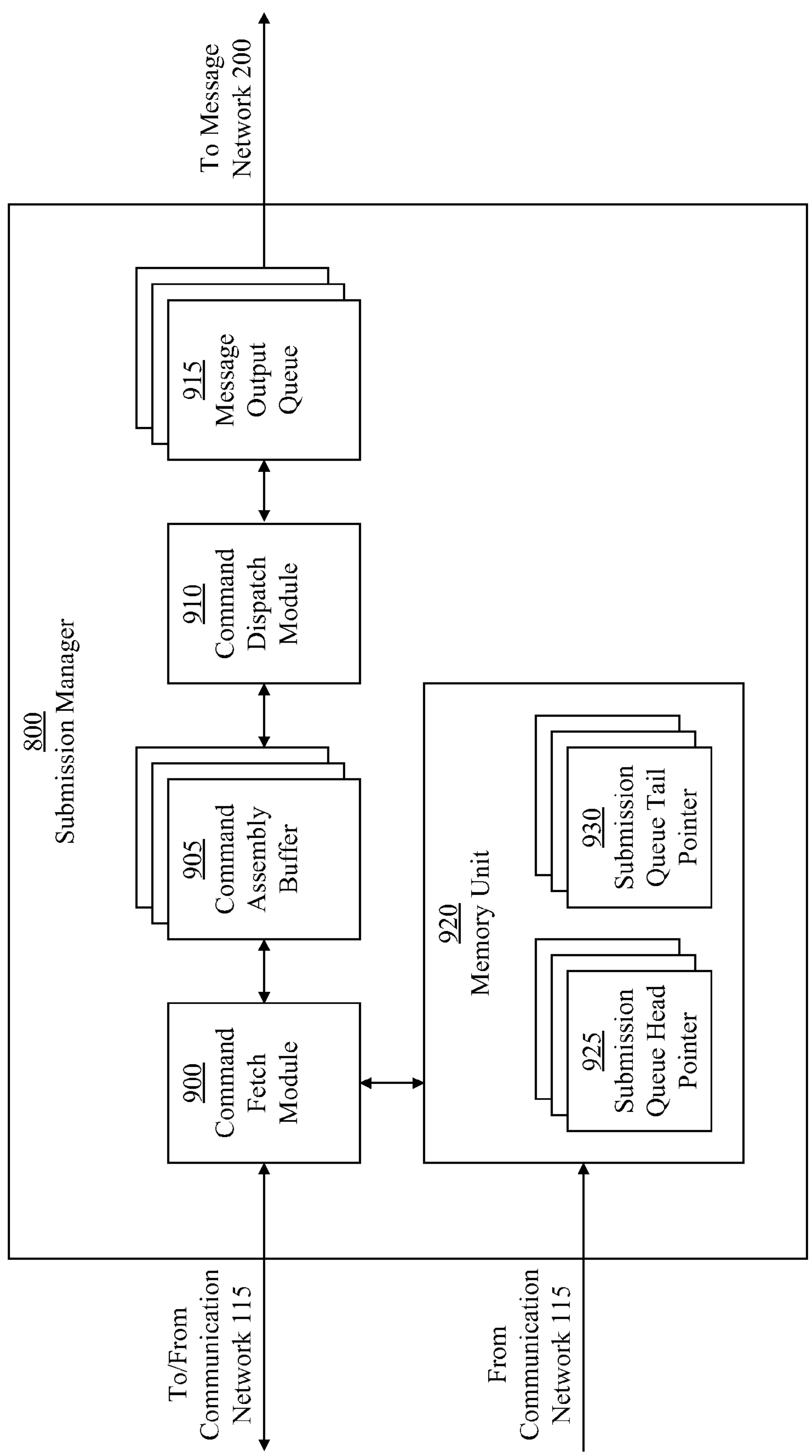
FIG. 9 is a block diagram of a submission manager, in accordance with an embodiment of the present invention.

FIG. 9 illustrates the submission manager 800, in accordance with an embodiment of the present invention. The submission manager 800 includes a command fetch module 900, command assembly buffers 905, a command dispatch module 910, message output queues 915, and a memory unit 920. The command fetch module 900 is coupled (e.g., connected) to the communication network 115, the command assembly buffers 905, and the memory unit 920. Additionally, the memory unit 920 is coupled (e.g., connected) to the communication network 115. The command dispatch module 910 is coupled (e.g., connected) to the command assembly buffers 905 and the message output queues 915. Further, each of the message output queues 915 is coupled (e.g., connected) to the message network 200.

The memory unit 920 stores submission queue head pointers 925 corresponding to the submission queues 520 stored in the memory system 515 of the host processing unit 110. The memory unit 920 also stores submission queue tail pointers 930 corresponding to the submission queues 520.

In various embodiments, the host processing unit 110 maintains (e.g., updates) the submission queue tail pointers 930 so that each of the submission queue tail pointers 930 identifies the storage location 600 at the tail 610 of the corresponding submission queue 520. In these embodiments, the command fetch module 900 maintains (e.g., updates) the submission queue head pointers 925 so that each of the submission queue head pointers 925 identifies the storage location 600 at the head 605 of the corresponding submission queue 520. The command fetch module 900 determines whether a submission queue 520 contains a nonvolatile memory command based on both the submission queue head pointer 925 and the submission queue tail pointer 930 of the submission queue 520.

For example, the command fetch module 900 may determine that the submission queue 520 contains at least one nonvolatile memory command if the submission queue head pointer 925 and the submission queue tail pointer 930 of the submission queue 520 identify different storage locations 600 in the submission queue 520. Further in this example, the command fetch module 900 determines the submission queue 520 does not contain any nonvolatile memory command (i.e., the submission queue 520 is empty) if the submission queue head pointer 925 and the submission queue tail pointer 930 of the submission queue 520 identify the same storage location 600 in the submission queue 520.

In operation, the command fetch module 900 monitors the submission queue head pointers 925 and the submission queue tail pointers 930. If the command fetch module 900 identifies a submission queue 520 storing at least one nonvolatile memory command, the command fetch module 900 generates a read request packet including an identifier identifying a storage location 600 in the submission queue 520 and transmits the read request packet to the host processing unit 110 through the communication network 115. The host processing unit 110 reads the nonvolatile memory command from the storage location 600 of the submission queue 520 based on the identifier of the read request packet, generates a completion packet including the nonvolatile memory command, and transmits the completion packet to the command fetch module 900 through the communication network 115.

The command fetch module 900 selects a command assembly buffer 905 and writes the nonvolatile memory command contained in the completion packet to the selected command assembly buffer 905. Additionally, the command fetch module 900 updates the submission queue head pointer 925 of the submission queue 520 containing the nonvolatile memory command to indicate that the host controller interface 120 retrieved the nonvolatile memory command from the submission queue 520. For example, the command fetch module 900 may update (e.g., increment) the submission queue head pointer 925 of the submission queue 520 to point to the storage location 600 of the submission queue 520 containing the next nonvolatile memory command to be retrieved by the host controller interface 120.

The command dispatch module 910 monitors the command assembly buffers 905, identifies the command assembly buffer 905 storing the nonvolatile memory command, selects a processor 150 of the nonvolatile memory controller 105, and generates a request message packet including the nonvolatile memory command and an identifier of the processor 150. Further, the command dispatch module 910 selects a message output queue 915 and writes the request message packet into the selected message output queue 915. In this way, the command dispatch module 910 transfers the content of the command assembly buffer 905 to the selected message output queue 915. In turn, the message output queue 915 provides the request message packet to the message network 200 for routing to the processor 150 identified by the identifier in the request message packet.

Figure 10:
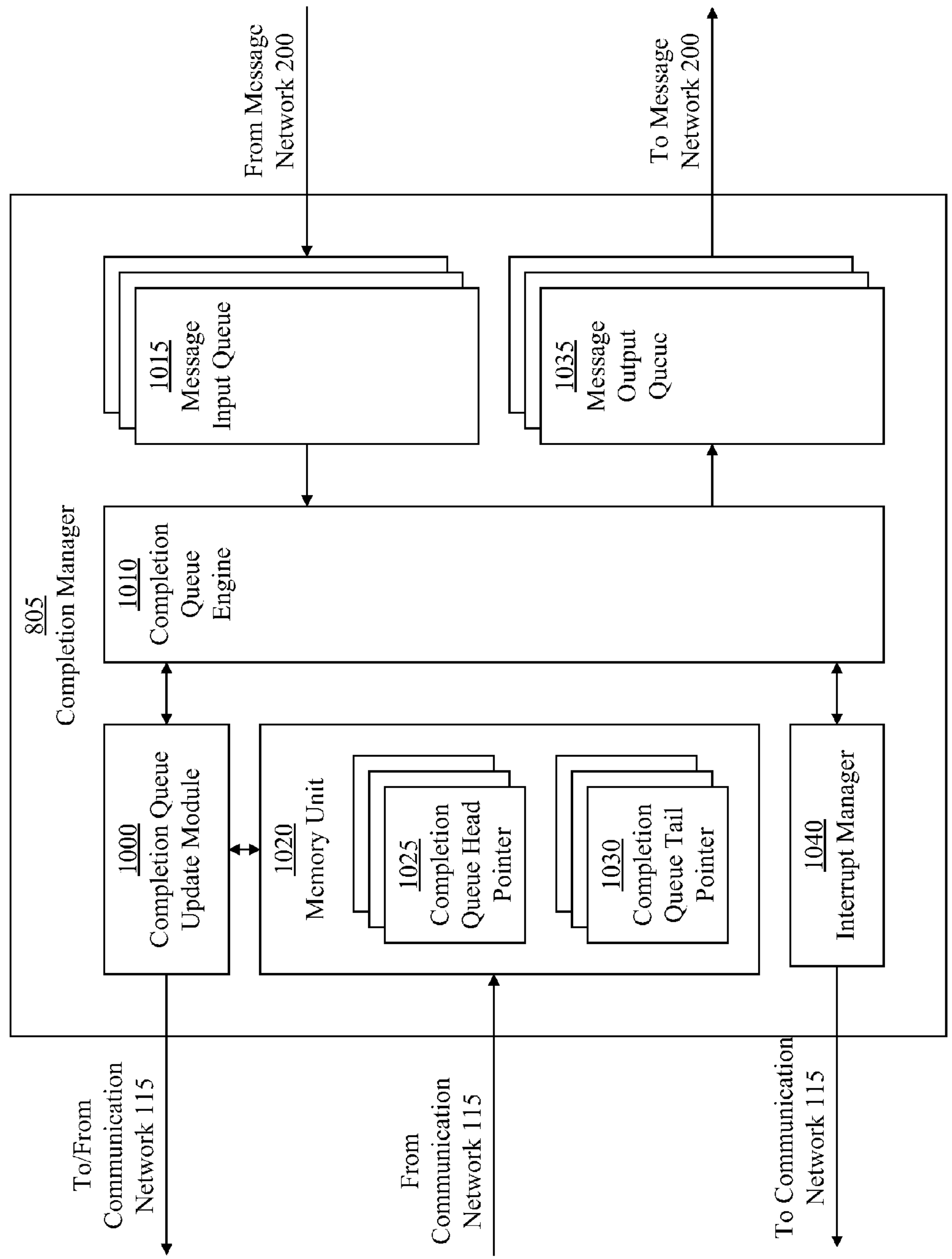
FIG. 10 is a block diagram of a completion manager, in accordance with an embodiment of the present invention.

FIG. 10 illustrates the completion manager 805, in accordance with an embodiment of the present invention. The completion manager 805 includes a completion queue update module 1000, a completion queue engine 1010, message input queues 1015, a memory unit 1020, message output queues 1035, and an interrupt manager 1040. The completion queue update module 1000 is coupled (e.g., connected) to the communication network 115, the memory unit 1020, and the completion queue engine 1010. Additionally, the memory unit 1020 is coupled (e.g., connected) to the communication network 115 and the interrupt manager 1040. Each of the message input queues 1015 and each of the message output queues 1035 is coupled (e.g., connected) to the completion queue engine 1010 and the message network 200. Further, the interrupt manager 1040 is coupled (e.g., connected) to the communication network 115 and the completion queue engine 1010.

The memory unit 1020 stores completion queue head pointers 1025 corresponding to the completion queues 525 stored in the memory system 515 of the host processing unit 110. The memory unit 1020 also includes completion queue tail pointers 1030 corresponding to the completion queues 525.

In various embodiments, the host processing unit 110 maintains (e.g., updates) the completion queue head pointers 1025 so that each of the completion queue head pointers 1025 identifies the storage location 700 at the head 705 of the corresponding completion queue 525. In these embodiments, the completion queue update module 1000 maintains (e.g., updates) the completion queue tail pointers 1030 so that each of the completion queue tail pointers 1030 identifies the storage location 700 at the tail 710 of the corresponding completion queue 525.

In operation, a message input queue 1015 receives a completion message packet from a processor 150 of the nonvolatile memory controller 105 through the message network 200 and stores the completion message packet. The completion message packet is associated with a request message packet including a nonvolatile memory command processed by the processor 150. Moreover, the completion message packet includes a completion status indicating a processing status of the nonvolatile memory command in the request message packet. The completion queue engine 1010 monitors the message input queues 1015, identifies the message input queue 1015 storing the completion message packet, reads the completion message packet from the message input queue 1015 storing the completion message packet, and provides the completion message packet to the completion queue update module 1000.

The completion queue update module 1000 generates a write request packet (e.g., a memory write request packet) based on the completion message packet and transmits the write request packet to the host processing unit 110 through the communication network 115. The write request packet includes the completion status of the nonvolatile memory command and a completion queue tail pointer 1030 identifying a storage location 700 at the tail 710 of a completion queue 525 for storing the completion status. Additionally, the completion queue update module 1000 updates the completion queue tail pointer 1030 in the nonvolatile memory controller 105 to identify the storage location 700 in the completion queue 525 for storing the next completion status. In some embodiments, the completion queue update module 1000 inserts the current submission queue head pointer 925 of the submission queue 520 associated with the completion queue 525 into the write request packet. In this way, the completion queue update module 1000 provides an update of the submission queue head pointer 925 to the host processing unit 110.

The host processing unit 110 receives the write request packet and stores the completion status contained in the write request packet into the storage location 700 at the tail 710 of the completion queue 525 identified by the completion queue tail pointer 1030 in the write request packet. The host processing unit 110 also updates a tail pointer of the completion queue 525 maintained in the host processing unit 110 (i.e., a local tail pointer) to identify the storage location 700 in the completion queue 525 for storing the next completion status.

Additionally, the host processing unit 110 receives an alert from the host controller interface 120 of the nonvolatile memory controller 105 indicating that a completion queue 525 contains an unprocessed completion status. In turn, the host processing unit 110 reads the completion status at the head 705 of the completion queue 525. In this way, the host processing unit 110 processes the completion status. Additionally, the host processing unit 110 updates a head pointer of the completion queue 525 maintained in the host processing unit 110 (i.e., a local head pointer) to identify the storage location 700 of the completion queue 525 containing the next completion status for processing. In this way, the host processing unit 110 frees the storage location 600 containing the processed completion status.

Further, the host processing unit 110 generates a write request packet including the head pointer of the completion queue 525 (i.e., a local head pointer) and transmits the request packet to the host controller interface 120 of the nonvolatile memory controller 105 through the communication network 115. In turn, the completion queue update module 1000 updates the completion queue head pointer 1025 of the completion queue 525 stored in the memory unit 1020 of the completion manager 805 with the head pointer of the request packet. In this way, the host processing unit 110 updates the completion queue head pointer 1025 in the memory unit 1020 of the completion manager 805.

Additionally, the host processing unit 110 updates a head pointer of the submission queue 520 maintained in the host processing unit 110 (i.e., a local head pointer) based on the submission queue head pointer 925 contained in the request packet, for example by setting the head pointer maintained in the host processing unit 110 to the submission queue head pointer 925 contained in the write request packet. In this way, the host processing unit 110 frees storage locations 600 containing nonvolatile memory commands processed by the nonvolatile memory controller 105 from the submission queue 520.

The completion queue engine 1010 also generates a notification message packet based on the completion message packet read from the message input queue 1015 and writes the notification message packet into a message output queue 1035. The notification message packet includes a completion status indicating the processing status of the completion message packet read from the message input queue 1015. For example, the completion status of the notification message packet may indicate whether processing of the completion message packet by the completion manager 805 was a success or a failure. The message output queue 1035 provides the notification message packet to the message network 200. In turn, the message network 200 routes the notification message packet to the processor 150 of the nonvolatile memory controller 105 that generated the completion message packet read from the message input queue 1015.

Figure 11:
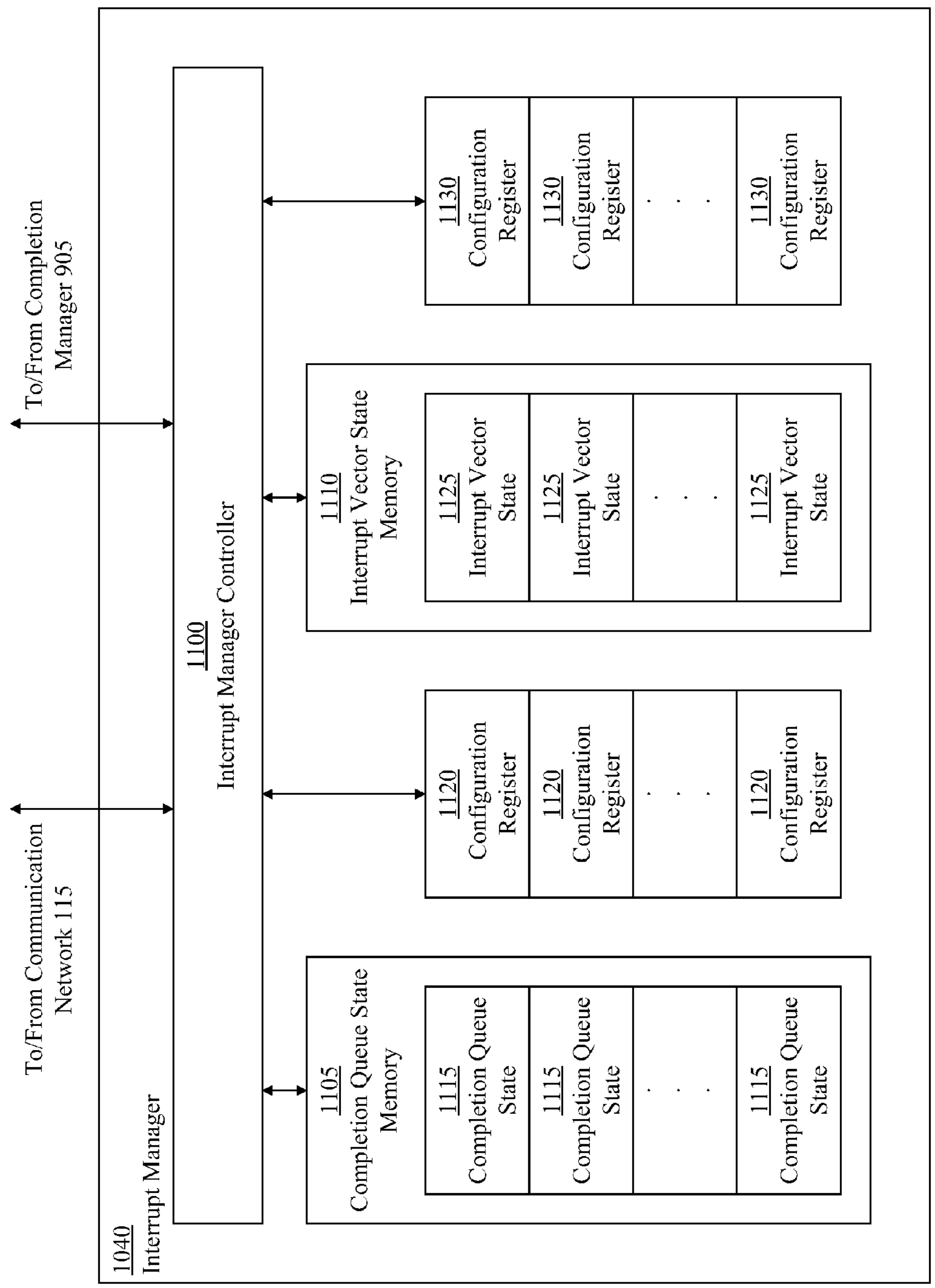
FIG. 11 is a block diagram of an interrupt manager, in accordance with an embodiment of the present invention.

FIG. 11 illustrates the interrupt manager 1040, in accordance with an embodiment of the present invention. The interrupt manager 1040 includes an interrupt manager controller 1100, a completion queue state memory 1105, and an interrupt vector state memory 1110. The interrupt manager controller 1100 is coupled (e.g., connected) to the completion manager 805, the communication network 115, the completion queue state memory 1105, and the interrupt vector state memory 1110.

In various embodiments, the interrupt manager 1040 (e.g., the interrupt manager controller 1100) monitors completion queue events and generates completion queue states 1115, each of which is associated with a corresponding completion queue 525 in the host processing unit 110. The completion queue state 1115 indicates the occurrence of completion queue events associated with the completion queue 525, as is described more fully herein. The interrupt manager 1040 stores the completion queue states 1115 into the completion queue state memory 1105.

Additionally, the interrupt manager 1040 generates interrupt vector states 1125 based on the completion queue states. Each of interrupt vector states 1125 is associated with a corresponding interrupt vector in the host processing unit 110. The interrupt vector state 1125 of an interrupt vector indicates whether one or more completion queues 525 associated with the interrupt vector state 1125 contain an unprocessed completion status, as is described more fully herein. The interrupt manager 1040 stores the interrupt vector states 1125 into the interrupt vector state memory 1110. In various embodiments, the interrupt manager 1040 maps one or more completion queues 525 to an interrupt vector in the host processing unit 110. In this way, the interrupt manager 1040 associates each of the completion queues 525 as well as the completion queue state 1115 of the completion queue 525 with the interrupt vector state 1125 of the interrupt vector.

Additionally, the interrupt manager 1040 includes configuration registers 1120, each of which is associated with a corresponding completion queue state 1115. The configuration register 1120 associated with a completion queue state 1115 stores configuration data for the completion queue state 1115. The configuration data stored in the configuration register 1120 includes an interrupt vector identifier of the interrupt associated with the completion queue state 1115. Moreover, the interrupt vector identifies an interrupt vector state 1125 associated with the interrupt vector. In this way, the interrupt vector identifies an interrupt vector state 1125 associated with the completion queue state 1115. In various embodiments, more than one completion queue state 1115 may be associated with the same interrupt vector state 1125.

Further, the interrupt manager 1040 includes configuration registers 1130, each of which is associated with a corresponding interrupt vector state 1125. The configuration register 1130 associated with an interrupt vector state 1125 stores configuration data for the interrupt vector state 1125. The configuration data stored in the configuration register 1130 includes the interrupt vector associated with the interrupt vector state 1125. Additionally, the configuration data may include other information for generating an interrupt message packet to trigger an interrupt in the host processing unit 110, as is described more fully herein. For example, the configuration data may include an interrupt type indicating a type of the interrupt associated with the interrupt vector state 1125. As another example, the configuration data may include one or more threshold values or enable values for controlling a rate at which interrupts are triggered in the host processing unit 110, as is described more fully herein.

The interrupt manager 1040 determines based on the interrupt vector state 1125 whether any completion queue 525 associated with the interrupt vector state 1125 contains an unprocessed completion status. If the interrupt manager 1040 determines at least one of the completion queues 525 contains an unprocessed completion status, the interrupt manager 1040 generates an interrupt message packet, which includes the interrupt vector associated with the interrupt vector state 1125. In some embodiments, the interrupt manager 1040 refrains from generating further interrupt message packets unless one or more conditions in the interrupt vector state 1125 are satisfied, as is described more fully herein. In this way, the interrupt manager 1040 controls a transmission rate of interrupt packets transmitted to the host processing unit 110.

The interrupt manager 1040 transmits the interrupt message packet to the host processing unit 110 through the communication network 115. In turn, the communication interface 510 of the host processing unit 110 generates an interrupt in the computing processor 500 based on the interrupt vector contained in the interrupt message packet. In this way, the interrupt message packet generates (i.e., triggers) the interrupt in the host processing unit 110 for alerting the host processing unit 110 of an unprocessed completion status in the completion queue 525 associated with the interrupt vector. Because the nonvolatile memory controller 105 alerts the host processing unit 110 to an unprocessed completion status in the completion queue 525, the host processing unit 110 need not include resources for monitoring the completion queue 525 for an unprocessed completion status. Furthermore, because the interrupt manager 1040 generates interrupt message packets for alerting the host processing unit 110 of unprocessed completion statuses in the completion queues 525 of the host processing unit 110, the processors 150 of the nonvolatile memory controller 105 need not consume computing resources for determining whether the completion queues 525 of the host processing unit 110 contain unprocessed completion statuses or for alerting the host processing unit 110 of unprocessed completion statuses in the completion queues 525.

In response to generation of the interrupt, the computing processor 500 identifies and processes any unprocessed completion status in one or more completion queues 525 associated with the interrupt vector. For example, the interrupt vector may indicate an address of an interrupt service routine (ISR) for identifying and processing any unprocessed completion queue status in the completion queue 525 associated with the interrupt vector. In this example, the computing processor 500 executes the interrupt service routine in response to generation of the interrupt.

In various embodiments, the host processing unit 110 generates a hardware interrupt in response to receiving an interrupt message packet. In some embodiments, the communication interface 510 generates the hardware interrupt by asserting a signal on a dedicated line (e.g., wire) connected to the communication interface 510 and the computing processor 500. For example, the dedicated line may be connected to an interrupt pin of the computing processor 500.

In some embodiments, the hardware interrupt generated in the host processing unit 110 is a message signal interrupt (MSI) or an extended message signal interrupts (MSI-X) as defined in the PCI Specification 3.0. In some embodiments, the hardware interrupt generated in the host processing unit 110 is an INTx interrupt as defined in a PCIe specification, such as the PCIe Specification 3.0.

In some embodiments, the interrupt manager controller 1100 generates and updates the completion queue states 1115 in response to completion queue events occurring in the non-volatile memory controller 105. An example of a completion queue event is the host processing unit 110 updating a completion queue head pointer 1025 in the completion manager 805 for a completion queue 525 in the host processing unit 110. Another example of a completion queue event is the completion manager 805 receiving a completion message including a completion status to be stored in a completion queue 525 of the host processing unit 110 and in which a completion queue event flag is set. In various embodiments, the interrupt manager controller 1100 updates the completion queue states 1115 on an ongoing basis as the completion queue events occur. For example, the interrupt manager controller 1100 may include a state machine for monitoring completion queue events and updating the completion queue states 1115 in the completion queue state memory 1105 in response to detecting the occurrence of a completion queue event.

The interrupt manager controller 1100 generates and updates the interrupt vector states 1125 based on the completion queue states 1115. The interrupt vector state 1125 indicates whether a completion queue 525 associated with the interrupt vector state 1125 contains a completion status that has not been processed by the host processing unit 110 (i.e., an unprocessed completion statuses). In various embodiments, the interrupt manager controller 1100 periodically updates the interrupt vector states 1125 based on the completion queue states 1115.

In some embodiments, the interrupt manager 1040 performs a scan of the completion queue state memory 1105 (i.e., a completion queue scan) as well as a scan of the completion queue head pointers 1025 and the completion queue tail pointers 1030. Further, the interrupt manger 1040 updates the interrupt vector states 1125 based on the completion queue states 1115, the completion queue head pointers 1025, and completion queue tail pointes 1030. The interrupt manager 1040 then performs a scan of the interrupt vector state memory 1110 (i.e., an interrupt vector scan) and determines based on each of the interrupt vector states 1125 whether to generate an interrupt message packet for the interrupt associated with the interrupt vector state 1125. In this way, the interrupt manager 1040 determines whether to generate interrupt message packets in two distinct phases of operation (i.e., a completion queue scan and an interrupt vector scan).

In various embodiments, the interrupt manager 1040 transmits an interrupt message packet to the host processing unit 110 through the communication network 115 and clears the interrupt vector state 1125. For example, the interrupt manager 1040 may clear the interrupt vector state 1125 by clearing the interrupt event indicators 1300 and the interrupt status 1330 in the interrupt vector state 1125.

In various embodiments, the interrupt manager 1040 is a hardware mechanism for generating interrupt message packets. For example, the interrupt manager controller 1100 in the interrupt manager 1040 may be a sequential logic circuit (e.g., a state machine). Because the interrupt manager 1040 is a hardware mechanism, the interrupt manager 1040 generates interrupt message packets more quickly than a software mechanism executing computing instructions to perform the same function.

Figure 12:
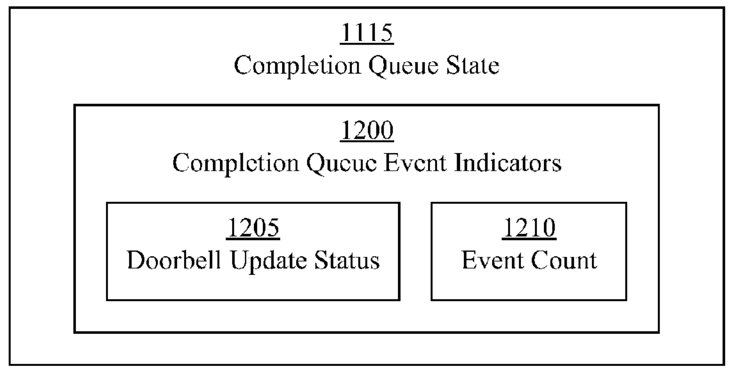
FIG. 12 is a block diagram of a completion queue state, in accordance with an embodiment of the present invention.

FIG. 12 illustrates the completion queue state 1115, in accordance with an embodiment of the present invention. The completion queue state 1115 includes one or more completion queue event indicators 1200. In the embodiment of FIG. 12, the completion queue event indicators 1200 include a doorbell update status 1205 and an event count 1210.

The doorbell update status 1205 indicates whether the host processing unit 110 has performed a doorbell update event since the last time the interrupt manager 1040 cleared the completion queue state 1115. In the doorbell update event, the host processing unit 110 updates the completion queue head pointer 1025 of the completion queue 525 associated with the completion queue state 1115. In various embodiments, the interrupt manager controller 1100 detects occurrences of the host processing unit 110 writing a head pointer 1025 into the memory unit 1020 of the completion manager 805 and sets the doorbell update status 1205 for a completion queue 525 to indicate at least one doorbell update event has occurred for the completion queue 525. In turn, the interrupt manager 1040 stores the doorbell update status 1205 into the completion queue state 1115 associated with the completion queue 525.

In various embodiments, a processor 150 generates a completion message packet including a completion status for a completion queue 525. Additionally, the processor 150 sets a completion queue event flag in the completion message packet. In these embodiments, the event count 1210 in the completion queue state 1115 associated with the completion queue 525 indicates a number of completion packets generated by the processors 150 in which a completion queue event flag is set since the last time the interrupt manager 1040 cleared the completion queue state 1115. Moreover, the completion queue manager 1040 generates a write request packet based on the completion message packet and transmits the write request packet to the host processing unit 110. In response to the completion queue manger 1040 transmitting the write request packet to the host processing unit 110, the interrupt manager controller 1100 updates the event count 1210 to indicate an completion queue update event has occurred.

Figure 13:
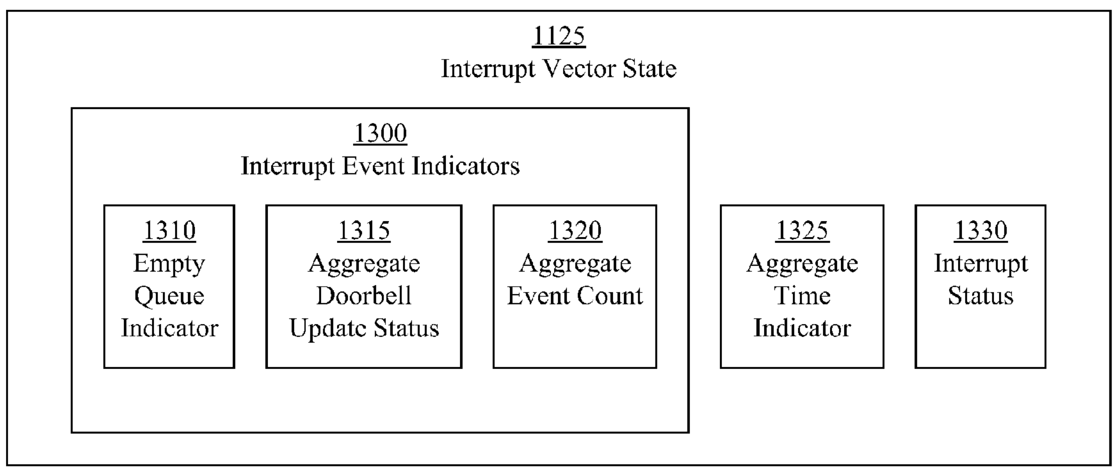
FIG. 13 is a block diagram of an interrupt vector state, in accordance with an embodiment of the present invention.

FIG. 13 illustrates the interrupt vector state 1125, in accordance with an embodiment of the present invention. The interrupt vector state 1125 includes one or more interrupt event indicators 1300, an aggregate time indicator 1325, and an interrupt status 1330. In the embodiment of FIG. 13, the interrupt event indicators 1300 include an empty queue indicator 1310, an aggregate doorbell update status 1315, and an aggregate event count 1320.

The interrupt status 1330 indicates a state of the interrupt associated with the interrupt vector state 1125. The interrupt manager 1040 initializes the interrupt status 1330 to an idle state. Moreover, the interrupt manager 1040 updates the interrupt status 1330 of the interrupt vector state 1125 based on the interrupt event indicators 1300 in the interrupt vector state 1125 when updating the interrupt vector state 1125. Further, the interrupt manager 1040 generates an interrupt message packet for the interrupt vector state 1125 if the interrupt status 1330 indicates the interrupt associated with the interrupt vector state 1125 is pending (i.e., the interrupt status 1330 is set to a pending state). Moreover, the interrupt message packet includes the interrupt vector associated with the interrupt vector state 1125.

In various embodiments, the interrupt manager 1040 sets the empty queue indicator 1310 of the interrupt vector state 1125 if all completion queues 525 associated with the interrupt vector state 1125 are empty. The interrupt manager 1040 determines a completion queue 525 associated with a completion queue state 1115 is empty by determining the completion queue head pointer 1025 and the completion queue tail pointer 1030 of the completion queue 525 identify the same storage location 700 in the completion queue 525.

Moreover, the interrupt manager 1040 does not generate an interrupt message packet based on the interrupt vector state 1125 when the empty queue indicator 1310 is set. In this way, the interrupt manager 1040 is inhibited from generating the interrupt message packet.

In some embodiments, the interrupt manager 1040 clears the interrupt status 1330 to inhibit generation of an interrupt message. For example, if the interrupt status 1330 is set during a previous scan of the interrupt vector state memory 1110 and the empty queue indicator 1310 is set during a current scan of the interrupt vector state memory 1110, the interrupt manager controller 1100 clears the interrupt status 1330 to prevent generation of another interrupt associated with interrupt vector state 1125.

In various embodiments, the interrupt manager 1040 generates the aggregate event count 1320 in the interrupt vector state 1125 by summing the event counts 1210 contained in the completion queue states 1115 associated with the interrupt vector state 1125. Further, the interrupt manager 1040 aggregates (i.e., adds together) the sum of event counts 1210 for each update of the interrupt vector state 1125 since that last time the interrupt vector state 1125 was cleared. The interrupt manager 1040 sets the interrupt status 1330 of the interrupt vector state 1125 to a pending state if the aggregate event count 1320 of the interrupt vector state 1125 has reached an aggregate event count threshold and all conditions in the interrupt vector state 1125 are satisfied (e.g., the empty queue indicator 1310 is clear). In this way, the interrupt manager 1040 controls a transmission rate of interrupt message packets to the host processing unit 110 based on the aggregate event count threshold. In some embodiments, the aggregate event count threshold is a user programmable value in the interrupt manager 1040.

The aggregate time indicator 1325 indicates a time period between the last time the interrupt manager 1040 generated an interrupt message packet for all completion queues 525 associated with an interrupt vector state 1125. In various embodiments, the interrupt manager 1040 does not set the interrupt status 1330 to the pending state if the aggregate time indicator 1325 is enabled but has not reached an aggregate time threshold. In this way, the interrupt manager 1040 is inhibited from generating an interrupt message packet. In various embodiments, the interrupt manager 1040 sets the aggregate doorbell update status 1315 to indicate the host processing unit 110 has updated the completion queue head pointer 1025 for all completion queues 525 associated with the interrupt vector state 1125 since the last time the interrupt manager 1040 processed the interrupt vector state 1125.

When the aggregate time indicator 1325 is enabled, the interrupt manager 1040 controls a transmission rate of interrupt message packets to the host processing unit 110 based on the aggregate time threshold. In some embodiments, the aggregate time threshold is a user programmable value in the interrupt manager 1040. In various embodiments, one or more of the empty queue indicator 1310, the aggregate doorbell update status 1315, the aggregate event count 1320, and the aggregate time indicator 1325 is optional.

Figure 14:
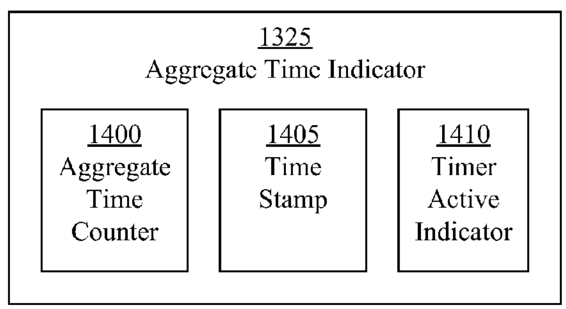
FIG. 14 is a block diagram of an aggregate time indicator, in accordance with an embodiment of the present invention.

FIG. 14 illustrates the aggregate time indicator 1325, in accordance with an embodiment of the present invention. The aggregate time indicator 1325 includes an aggregate time counter 1400, a time stamp 1405, and a timer active indicator 1410. The interrupt manager controller 1100 sets the time stamp 1405 to a time generated by a timer (e.g., a global timer) in the nonvolatile memory controller 105 when clearing the interrupt vector state 1125 and when updating the interrupt vector state 1125. When updating the interrupt vector state 1125, the interrupt manager controller 1100 computes a difference between the timer in the nonvolatile memory controller 105 (e.g., the global timer) and the time stamp 1405, updates the aggregate time counter 1400 by adding the result to the aggregate time counter 1400, and sets the time stamp 1405 to the timer (e.g., global timer). In this way, the interrupt manager controller 1100 determines a time period between the last time the interrupt manager 1040 updated the interrupt vector state 1125 during an interrupt vector scan and the current time generated by the timer.

The timer active indicator 1410 indicates whether the aggregate time indicator 1325 is active counting time. In various embodiments, the interrupt manager controller 1100 sets the timer active indicator 1410 to indicate the aggregate time indicator 1325 is active when the interrupt manager 1040 sets the interrupt status 1330 to pending. In this way, the interrupt manager controller 1100 starts the aggregate time counter 1400 in the aggregate time indicator 1325. Moreover, the interrupt manager controller 1100 refrains from setting the interrupt status 1330 in the interrupt vector state 1125 when the aggregate time indicator 1325 is enabled but has not reached a threshold value.

Figure 15:
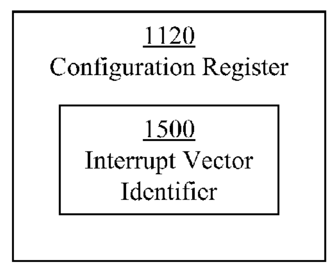

FIG. 15 illustrates the configuration register 1120, in accordance with an embodiment of the present invention. The configuration register 1120 includes an interrupt vector identifier 1500 identifying the interrupt vector associated with the completion queue state 1115 that is associated with the configuration register 1120. The interrupt vector identifier 1500 identifies the interrupt associated with the completion queue 525 that is associated with the completion queue state 1115. Further, the interrupt vector identifier 1500 identifies the interrupt vector state 1125 associated with the interrupt. In this way, the interrupt vector identifier 1500 identifies the interrupt vector state 1125 associated with the completion queue state 1115.

Figure 16:
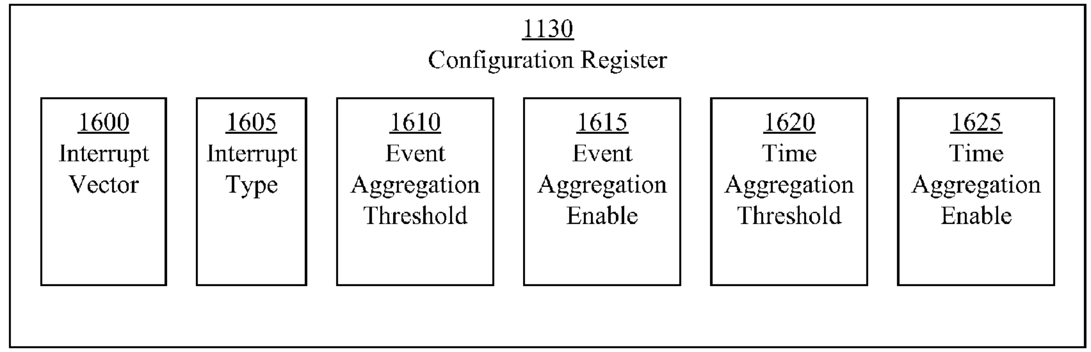

FIG. 16 illustrates the configuration register 1130, in accordance with an embodiment of the present invention. The configuration register 1130 is associated with an interrupt vector state 1125 and includes an interrupt vector 1600 associated with that interrupt vector state 1125. In this way, the interrupt vector 1600 identifies the interrupt associated with the interrupt vector state 1125. The configuration register 1130 also includes an interrupt type 1605 indicating a type of the interrupt. For example, the interrupt may be a message signal interrupt (MSI), an extended message signal interrupts (MSI-X), or an INTx virtual wire interrupt.

In some embodiments, the configuration register 1130 includes an event aggregation threshold 1610 and an event aggregation enable 1615. The event aggregation threshold 1610 is a threshold value for inhibiting generation of a subsequent interrupt status 1330 of an interrupt vector state 1125 for a period of time after generation of a previous interrupt status 1330 of that interrupt vector state 1125. For example, the event aggregation threshold 1610 may be a threshold for an aggregate event count (i.e., an aggregate event count threshold). The event aggregation enable 1615 indicates whether the aggregate event count 1320 is enabled.

In various embodiments, the interrupt manager 1040 performs a scan of the interrupt vector state memory 1110 and sets the interrupt status 1330 of an interrupt vector state 1125 to indicate the interrupt associated with the interrupt vector state 1125 is pending if one or more of the interrupt event indicators 1300 indicate a completion queue event has occurred. If the aggregate event count 1320 of the interrupt vector state 1125 has not reached the event aggregation threshold 1610 on a subsequent scan of the interrupt vector state memory 1110, the interrupt manager 1040 refrains from setting the interrupt status 1330 to pending. In this way, the interrupt manager 1040 controls a transmission rate of interrupt packets transmitted to the host processing unit 110. Furthermore, if the aggregate event count 1320 of the interrupt vector state 1125 has reached the event aggregation threshold 1610 on a subsequent scan of the interrupt vector state memory 1110, the interrupt manager 1040 sets the interrupt status 1330 of the interrupt vector state 1125 to pending and clears the aggregate event count 1320 in the interrupt vector state 1125. As a result, the aggregate event count 1320 may begin aggregating new completion queue events.

In some embodiments, the configuration register 1130 includes an time aggregation threshold 1620 and a time aggregation enable 1625. The time aggregation threshold 1620 is a threshold value for inhibiting generation of a subsequent interrupt status 1330 of an interrupt vector state 1125 for a period of time after generation of a previous interrupt status 1330 of that interrupt vector state 1125. The time aggregation enable 1625 indicates whether the aggregate time indicator 1325 is enabled.

In various embodiments, the interrupt manager 1040 performs a scan of the interrupt vector state memory 1110 and sets the interrupt status 1330 of an interrupt vector state 1125 to indicate the interrupt associated with the interrupt vector state 1125 is pending if one or more of the interrupt event indicators 1300 indicate a completion queue event has occurred. Additionally, the interrupt manager 1040 enables the aggregate timer indicator 1325 by setting the timer active indicator 1410 of the aggregate timer indicator 1325. If the aggregate timer indicator 1325 of the interrupt vector state 1125 has not reached the time aggregation threshold 1620 on a subsequent scan of the interrupt vector state memory 1110, the interrupt manager 1040 refrains from setting the interrupt status 1330 to pending. In this way, the interrupt manager 1040 controls a transmission rate of interrupt packets transmitted to the host processing unit 110. Furthermore, if the aggregate timer indicator 1325 of the interrupt vector state 1125 has reached the time aggregation threshold 1620 on a subsequent scan of the interrupt vector state memory 1110 and at least one completion queue 525 associated with the interrupt vector state 1125 contains at least one unprocessed completion status, the interrupt manager 1040 sets the interrupt status 1330 of the interrupt vector state 1125 to pending, keeps the timer active indicator 1410 of the aggregate timer indicator 1325 set, but clears the aggregate time counter 1400. As a result, the aggregate time counter 1400 begins to count from an initial value (e.g., zero).

Figure 17:
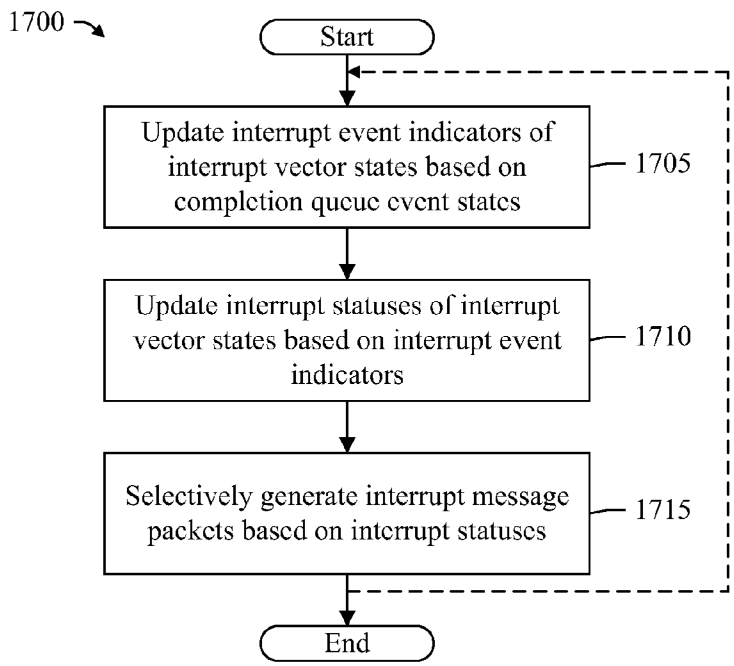
FIG. 17 is a flow chart for a method of alerting a host processing unit of an unprocessed completion status, in accordance with an embodiment of the present invention.

FIG. 17 illustrates a method 1700 of alerting a host processing unit of an unprocessed completion status, in accordance with an embodiment of the present invention. In step 1705, interrupt event indicators of interrupt vector states are updated based on the completion queue states. In various embodiments, the interrupt manager 1040 updates the interrupt event indicators 1300 of the interrupt vector states 1125 based on the completion queue states 1115, as is described more fully herein. For example, the interrupt manager 1040 may update the interrupt event indicators 1300 of each interrupt vector state 1125 based on the completion queue event indicators 1200 of each completion queues state 1115 associated with the interrupt vector state 1125. Additionally, the interrupt manager 1040 clears the completion queue states 1115, for example by setting each of the completion queue event indicators of the completion queue states 1115 to an initial value (e.g., zero). In this way, the interrupt manager 1040 resets the completion queue states 1115. The method 1700 then proceeds to step 1710.

In step 1710, interrupt statuses of the interrupt vector states are updated based on the interrupt event indicators. In various embodiments, the interrupt manager 1040 updates the interrupt statuses 1330 of the interrupt vector states 1125 based on interrupt event indicators 1300 of the interrupt vector states 1125, as is described more fully herein. For example, the interrupt manager 1040 may update the interrupt status 1230 of each interrupt vector state 1125 based on the interrupt event indicators 1300 of the interrupt vector state 1125 to indicate whether the interrupt status 1330 of the interrupt vector state 1125 is in an idle state or a pending state. In some embodiments, the interrupt manager 1040 updates the interrupt statuses 1330 of the interrupt vector states 1125 based on interrupt event indicators 1300 and the aggregate time indicators 1325 of the interrupt vector states 1125, as is described more fully herein. The method 1700 then proceeds to step 1715.

In step 1715, interrupt message packets are selectively generated based on the interrupt statuses. In various embodiments, the interrupt manager 1040 in the host controller interface 120 of the nonvolatile memory controller 105 selectively generates interrupt message packets based on the interrupt statuses 1330 of the interrupt vector states 1125. For example, the interrupt manager 1040 may generate an interrupt message packet for each interrupt vector state 1125 in which the interrupt status 1330 is pending (i.e., set to a pending state). The method 1700 then ends. In various embodiments, the method 1700 includes more than one iteration of the steps 1705-1715. In these embodiments, the method 1700 returns to step 1705 after step 1715 for each additional iteration of the steps 1705-1715.

In various embodiments, the method 1700 illustrated in FIG. 17 may include more or fewer than the steps 1705-1715 illustrated in FIG. 17 and described above. In some embodiments, the steps 1705-1715 of the method 1700 illustrated in FIG. 17 may be performed in a different order than the order illustrated in FIG. 17 and described above. In some embodiments, some of the steps 1705-1715 of the method 1700 illustrated in FIG. 17 may be performed in parallel or substantially simultaneously. For example, step 1715 may be performed in parallel with steps 1705 and 1710. In various embodiments, one or more of the steps 1705-1715 may be performed more than once in the method 1700 illustrated in FIG. 17.

Figure 18:
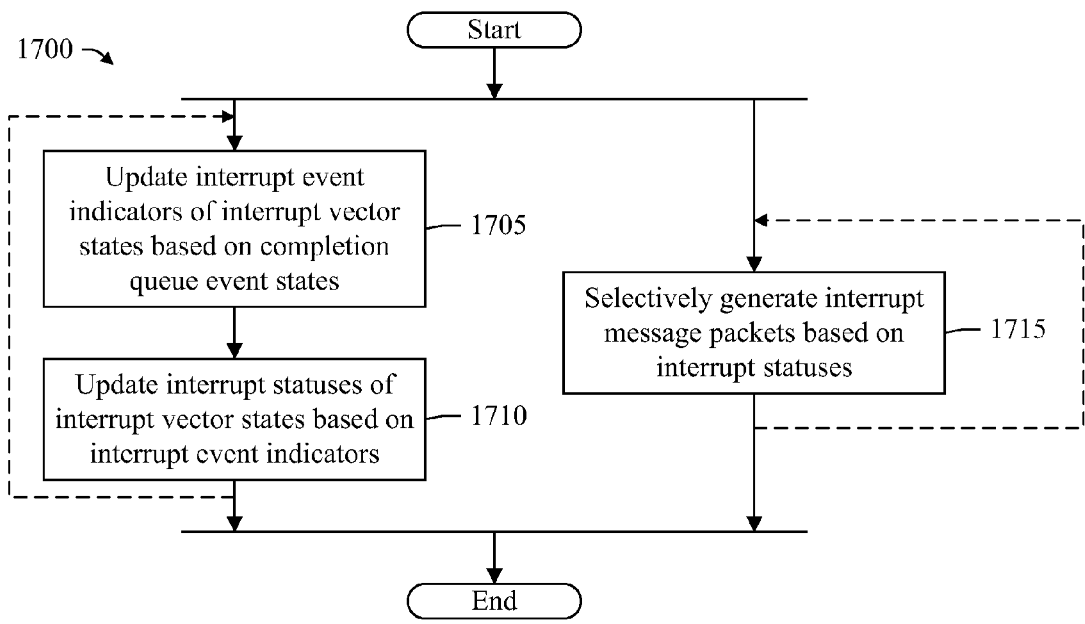
FIG. 18 is a flow chart for a method of alerting a host processing unit of an unprocessed completion status, in accordance with an embodiment of the present invention.

FIG. 18 illustrates the method 1700, in accordance with another embodiment of the present invention. In this embodiment, the step 1715 is performed in parallel with steps 1705 and 1710. In various embodiments, the sequence of steps 1705 and 1710 is an iteration of a loop in the method 1700. Moreover, the method 1700 may include more than one iteration of the loop including the steps 1705 and 1710. Furthermore, the step 1715 is an iteration of a loop in the method 1700, and the method 1700 may include more than one iteration of the loop including the step 1715. Because the step 1715 is performed in parallel with the steps 1705 and 1710, the overall loop time is decreased in the method 1700 of FIG. 18 in comparison to the method 1700 of FIG. 17. As a result, the method of the FIG. 18 may control generation of interrupts in the host processing unit 110 more precisely than the method of FIG. 17.

Figure 19:
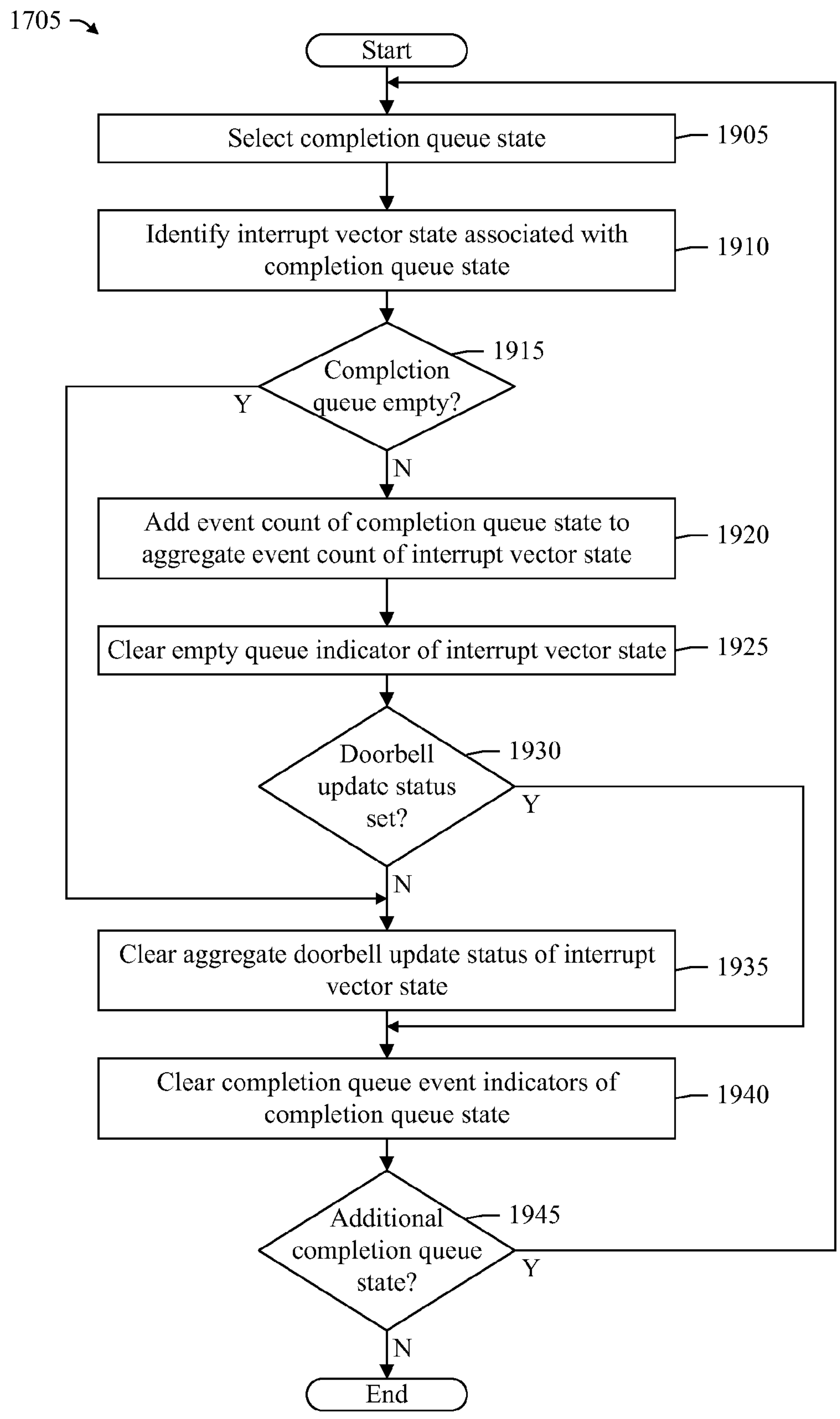
FIG. 19 is a flow chart for a portion of a method of alerting a host processing unit of an unprocessed completion status, in accordance with an embodiment of the present invention.

FIG. 19 illustrates a portion of the method 1700 of alerting a host processing unit of an unprocessed completion status, in accordance with an embodiment of the present invention. The portion of the method 1700 illustrated in FIG. 19 illustrates embodiments of the step 1705 illustrated in FIG. 17 and FIG. 18.

In step 1905, a completion queue state is selected. In various embodiments, the interrupt manager 1040 selects a completion queue state 1115. For example, the interrupt manager 1040 may select a completion queue state 1115 for processing based on a predetermined selection order. The portion of the method 1700 then proceeds to step 1910.

In step 1910, the interrupt vector state associated with the completion queue state is identified. In various embodiments, the interrupt manager 1040 identifies the interrupt vector state 1125 associated with the completion queue state 1115 (i.e., the selected completion queue state). For example, the interrupt manager 1040 may identify the interrupt vector state 1125 associated with the completion queue state 1115 based on the interrupt vector identifier 1500 in the configuration register 1120 associated with the completion queue state 1115. The portion of the method 1700 then proceeds to step 1915.

In step 1915, it is determined whether the completion queue associated with the completion queue state is empty. In various embodiments, the interrupt manager 1040 determines whether the completion queue 525 associated with the completion queue state 1115 is empty. In various embodiments, the interrupt manager 1040 determines whether the completion queue 525 associated with the completion queue state 1115 is empty based on the completion queue head pointer 1025 and the completion queue tail pointer 1030 of the completion queue 525, as is described more fully herein. If the completion queue 525 associated with the completion queue state 1115 is empty, the portion of the method 1700 proceeds to step 1935. Otherwise, the portion of the method 1700 proceeds to step 1920.

In step 1920, arrived at from the determination in step 1915 that the completion queue is not empty, the event count of the completion queue state is added to the aggregate event count of the interrupt vector state. In various embodiments, the interrupt manager 1040 adds the event count 1210 of the completion queue state 1115 to the aggregate event count 1320 of the interrupt vector state 1125. The portion of the method 1700 then proceeds to step 1925.

In step 1925, the empty queue indicator of the interrupt vector state 1125 is cleared. In various embodiments, the interrupt manager 1040 clears the empty queue indicator 1310 of the interrupt vector state 1125. The portion of the method 1700 then proceeds to step 1930.

In step 1930, it is determined whether the doorbell update status of the completion queue state is set. In various embodiments, the interrupt manager 1040 determines whether the doorbell update status 1205 of the completion queue state 1115 is set. If the doorbell update status 1205 of the completion queue state 1115 is set, the portion of the method 1700 proceeds to step 1940. Otherwise, the portion of the method 1700 proceeds to step 1935.

In step 1935, arrived at from the determination in step 1915 that the completion queue associated with the completion queue state is empty or the determination in step 1930 that the doorbell update status of the completion queue state is not set, the aggregate doorbell update status of the interrupt vector state 1125 is cleared. In various embodiments, the interrupt manager 1040 clears the aggregate doorbell update status 1315 of the interrupt vector state 1125. For example, the interrupt manager 1040 may clear the aggregate doorbell update status 1315 of the interrupt vector state 1125 by setting the aggregate doorbell update status 1315 to a value of zero. The portion of the method 1700 then proceeds to step 1940.

In step 1940, the completion queue event indicators 1200 are cleared in the completion queue state. In various embodiments, the interrupt manager 1040 clears the completion queue event indicators 1200 in the completion queue state 1115. For example, the interrupt manager 1040 may clear the doorbell update status 1205 and the event count 1210 in the completion queue state 1115. The portion of the method 1700 then proceeds to step 1945.

In step 1945, it is determined whether an additional completion queue state is to be processed. In various embodiments, the interrupt manager 1040 determines whether an additional completion queue state 1115 is to be processed. If an additional completion queue state 1115 is to be processed, the portion of the method 1700 returns to step 1905. Otherwise, the portion of the method 1700 ends.

In various embodiments, the portion of the method 1700 illustrated in FIG. 19 may include more or fewer than the steps 1905-1945 illustrated in FIG. 19 and described above. In some embodiments, the steps 1905-1945 of the portion of the method 1700 illustrated in FIG. 19 may be performed in a different order than the order illustrated in FIG. 19 and described above. In some embodiments, some of the steps 1905-1945 of the portion of the method 1700 illustrated in FIG. 19 may be performed in parallel or substantially simultaneously. In various embodiments, one or more of the steps 1905-1945 may be performed more than once in the portion of the method 1700 illustrated in FIG. 19.

Figure 20:
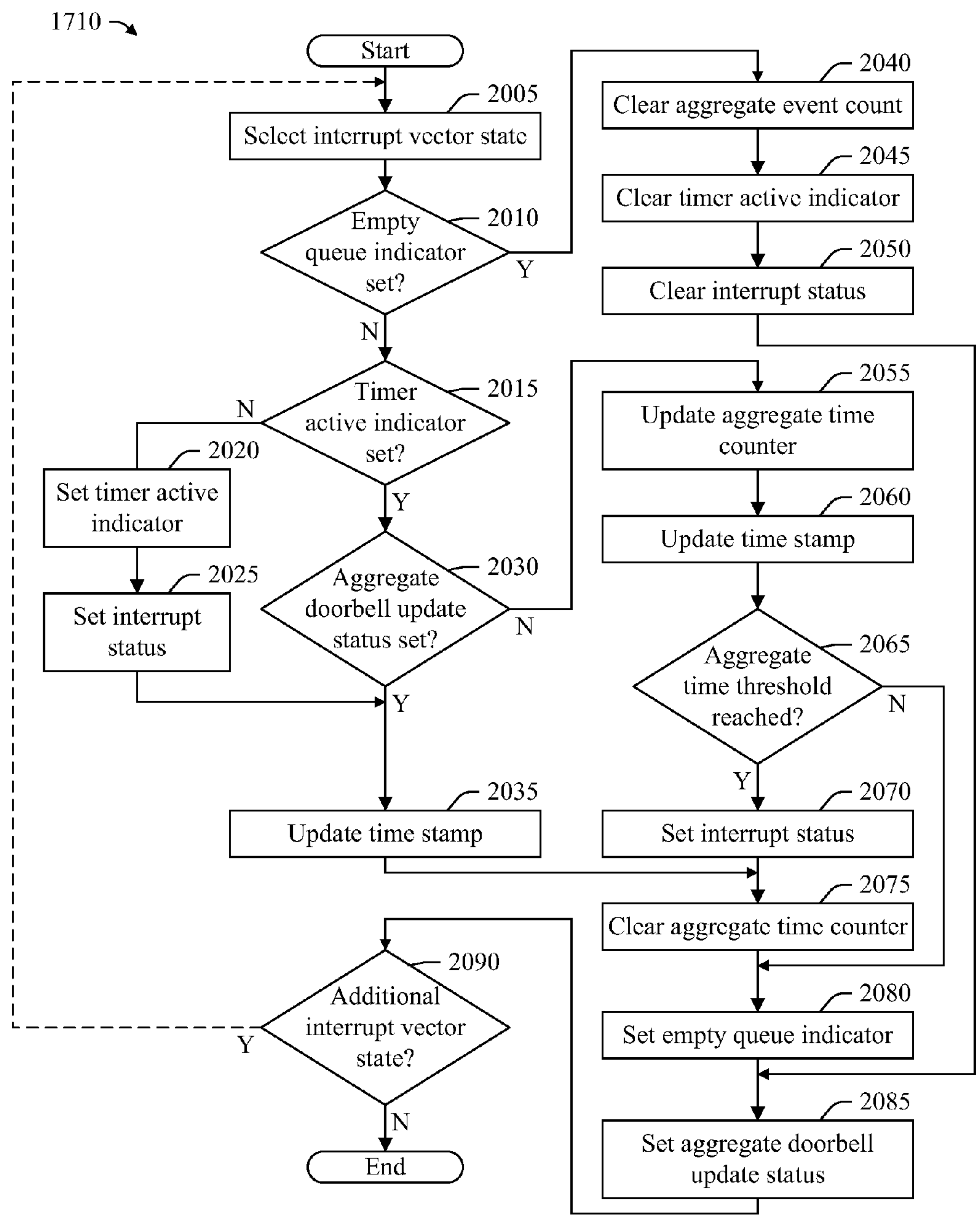
FIG. 20 is a flow chart for a portion of a method of alerting a host processing unit of an unprocessed completion status, in accordance with an embodiment of the present invention.

FIG. 20 illustrates a portion of the method 1700 of alerting a host processing unit of an unprocessed completion status, in accordance with an embodiment of the present invention. The portion of the method 1700 illustrated in FIG. 19 illustrates embodiments of the step 1710 illustrated in FIG. 17 and FIG. 18.

In step 2005, an interrupt vector state 1125 is selected. In various embodiments, the interrupt manager 1040 selects an interrupt vector state 1125. For example, the interrupt manager 1040 may select an interrupt vector state 1125 for processing based on a predetermined selection order. The portion of the method 1700 then proceeds to step 2010.

In step 2010, it is determined whether the empty queue indicator is set. In various embodiments, the interrupt manager 1040 determines whether the empty queue indicator 1310 of the interrupt vector state 1125 is set. If the empty queue indicator 1310 is set, the portion of the method 1700 proceeds to step 2040. Otherwise, the portion of the method 1700 proceeds to step 2015.

In step 2015, arrived at from the determination in step 2010 that the empty queue indicator is not set, it is determined whether the timer active indicator in the aggregated time indicator of the interrupt vector state is set. In various embodiments, the interrupt manager 1040 determines whether the timer active indicator 1410 in the aggregate time indicator 1325 of the interrupt vector state 1125 is set. If the timer active indicator 1410 is set, the portion of the method 1700 proceeds to step 2030. Otherwise, the portion of the method 1700 proceeds to step 2020.

In step 2020, arrived at from the determination in step 2015 that the timer active indicator 1410 is not set, the timer active indicator 2020 is set. In various embodiments, the interrupt manager 1040 sets the timer active indicator 1410 of the aggregate time indicator 1325 of the interrupt vector state 1125 to indicate the aggregate time indicator 1325 is active. The portion of the method 1700 then proceeds to step 2025.

In step 2025, the interrupt status of the interrupt vector state is set. In various embodiments, the interrupt manager 1040 sets the interrupt status 1330 of the interrupt vector state 1125. The portion of the method 1700 then proceeds to step 2035.

In step 2030, arrived at from the determination in step 2015 that the timer active indicator is set, it is determined whether the aggregate doorbell update status of the interrupt vector state is set. In various embodiments, the interrupt manager 1040 determines whether the aggregate doorbell update status 1315 of the interrupt vector state 1125 is set. If the aggregate doorbell update status 1315 is set, the portion of the method 1700 proceeds to step 2035. Otherwise, the portion of the method 1700 proceeds to step 2055.

In step 2035, arrived at from the determination in step 2030 that the aggregate doorbell update status is set, the time stamp of the aggregate time indicator 1325 is updated. In various embodiments, the interrupt manager 1040 updates the time stamp 1405 of the aggregate time indicator 1325 in the interrupt vector state 1125 by setting the time stamp 1405 to the value of a timer (e.g., a global timer) in the nonvolatile memory controller 105. The portion of the method 1700 then proceeds to step 2075.

In step 2040, arrived at from the determination in step 2010 that the empty queue indicator is set, the aggregate event count is cleared. In various embodiments, the interrupt manager 1040 clears the aggregate event count 1320 in the interrupt vector state 1125. The portion of the method 1700 then proceeds to step 2045.

In step 2045, the timer active indicator is cleared. In various embodiments, the interrupt manager 1040 clears the timer active indicator 1410 in the aggregate time indicator 1325 of the interrupt vector state 1125. The portion of the method 1700 then proceeds to step 2050.

In step 2050, the interrupt status of the interrupt vector state is cleared. In various embodiments, the interrupt manager 1040 clears the interrupt status 1330 of the interrupt vector state 1125. The portion of the method 1700 then proceeds to step 2085.

In step 2055, arrived at from the determination in step 2030 that the aggregate doorbell update status is not set, the aggregate time counter is updated. In various embodiments, the interrupt manager 1040 updates the aggregate time counter 1400 in the aggregate time indicator 1325 of the interrupt vector state 1125. For example, the interrupt manager 1040 may compute a difference between the time stamp 1405 in the aggregate time indicator 1325 and a timer in the nonvolatile memory controller 105 (e.g., the global timer), and add the result to the aggregate time counter 1400. The portion of the method 1700 then proceeds to step 2060.

In step 2060, the time stamp of the aggregate time indicator 1325 is updated. In various embodiments, the interrupt manager 1040 updates the time stamp 1405 of the aggregate time indicator 1325 in the interrupt vector state 1125 by setting the time stamp 1405 to the value of a timer (e.g., a global timer) in the nonvolatile memory controller 105. The portion of the method 1700 then proceeds to step 2065.

In step 2065, it is determined whether the time aggregation threshold is reached. In various embodiments, the interrupt manager 1040 determines whether the aggregate time counter 1400 has reached an aggregate time threshold. For example, the interrupt manager 1040 may determine whether the aggregate time counter 1400 has reached the time aggregation threshold 1620 in the configuration register 1130 associated with the interrupt vector state 1125. If the aggregate time counter 1400 has reached the time aggregation threshold 1620, the portion of the method 1700 proceeds to step 2070. Otherwise, the portion of the method 1700 proceeds to step 2080.

In step 2070, arrived at from the determination in step 2065 that the time aggregation threshold is reached, the interrupt status of the interrupt vector state 1125 is set. In various embodiments, the interrupt manager 1040 sets the interrupt status 1330 of the interrupt vector state 1125. The portion of the method 1700 then proceeds to step 2075.

In step 2075, arrived at from step 2035 in which the time stamp is updated or from step 2070 in which the interrupt status is set, the aggregate time counter is cleared. In various embodiments, the interrupt manager 1040 clears the aggregate time counter 1400 in the aggregate time indicator 1325 of the interrupt vector state 1125. The portion of the method 1700 then proceeds to step 2080.

In step 2080, arrived at from step 2065 in which it is determined that the aggregate time threshold is not reached or from step 2075 in which the aggregate time counter is cleared, the empty queue indicator of the interrupt vector state 1125 is set. In various embodiments, the interrupt manager 1040 sets the empty queue indicator 1310 of the interrupt vector state 1125. In this way, the interrupt manager 1040 initializes the empty queue indicator 1310. The portion of the method 1700 then proceeds to step 2085.

In step 2085, arrived at from step 2050 in which the interrupt status is cleared or from step 2080 in which the empty queue indicator is set, the aggregate doorbell update status of the interrupt vector state 1125 is set. In various embodiments, the interrupt manager 1040 sets the aggregate doorbell update status 1315 of the interrupt vector state 1125. In this way, the interrupt manager 1040 initializes the aggregate doorbell update status 1315. The portion of the method 1700 then proceeds to step 2090.

In step 2090, it is determined whether an additional interrupt vector state is to be processed. In various embodiments, the interrupt manager 1040 determines whether an additional interrupt vector state 1125 is to be processed. If an additional interrupt vector state 1125 is to be processed, the portion of the method 1700 returns to step 2005. Otherwise, the portion of the method 1700 ends.

In various embodiments, the portion of the method 1700 illustrated in FIG. 20 may include more or fewer than the steps 2005-2090 illustrated in FIG. 20 and described above. In some embodiments, the steps 2005-2090 of the portion of the method 1700 illustrated in FIG. 20 may be performed in a different order than the order illustrated in FIG. 20 and described above. In some embodiments, some of the steps 2005-2090 of the portion of the method 1700 illustrated in FIG. 20 may be performed in parallel or substantially simultaneously. In various embodiments, one or more of the steps 2005-2090 may be performed more than once in the portion of the method 1700 illustrated in FIG. 20.

Figure 21:
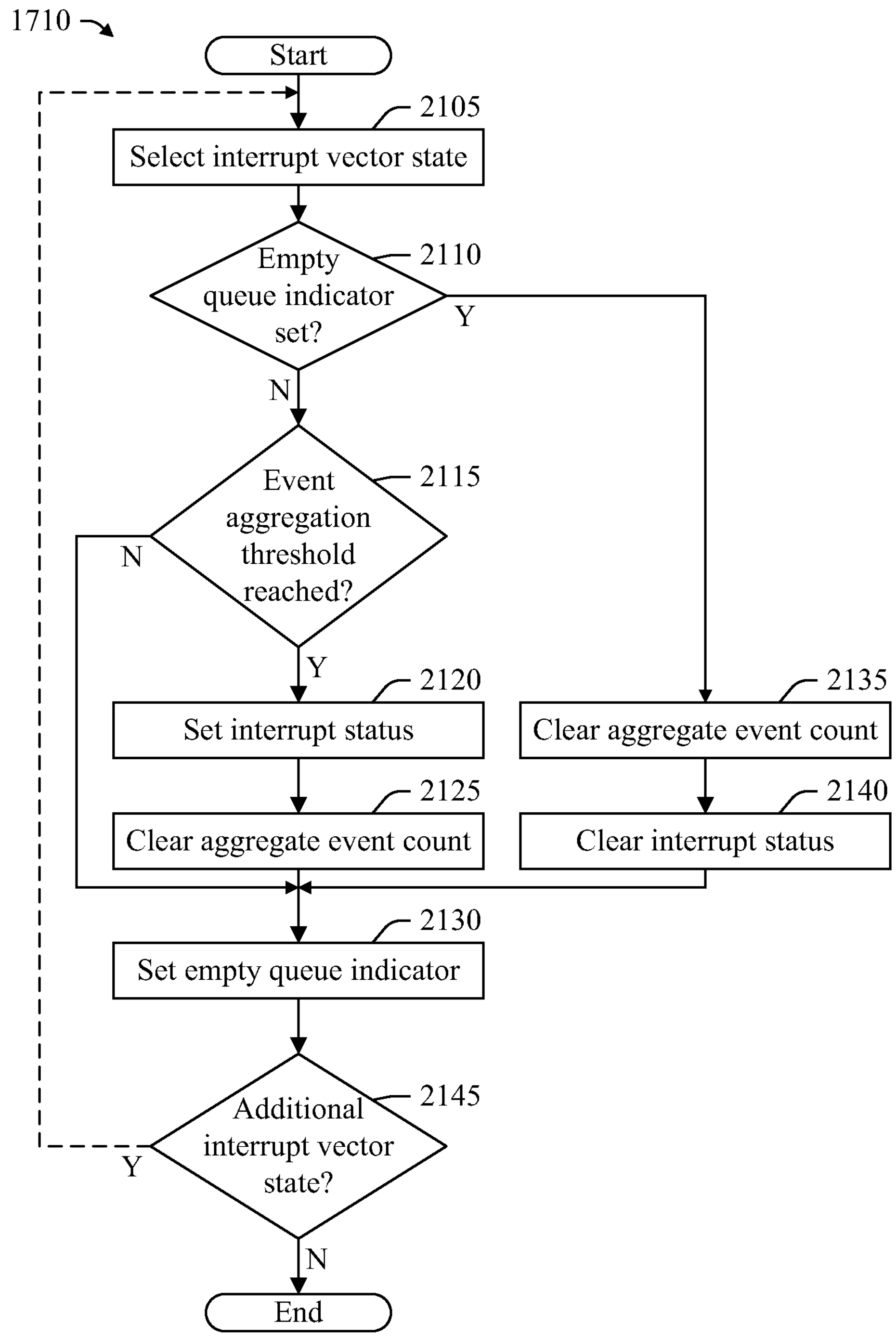
FIG. 21 is a flow chart for a portion of a method of alerting a host processing unit of an unprocessed completion status, in accordance with an embodiment of the present invention.

FIG. 21 illustrates a portion of the method 1700 of alerting a host processing unit of an unprocessed completion status, in accordance with an embodiment of the present invention. The portion of the method 1700 illustrated in FIG. 21 illustrates embodiments of the step 1710 illustrated in FIG. 17 and FIG. 18.

In step 2105, an interrupt vector state 1125 is selected. In various embodiments, the interrupt manager 1040 selects an interrupt vector state 1125. For example, the interrupt manager 1040 may select an interrupt vector state 1125 for processing based on a predetermined selection order. The portion of the method 1700 then proceeds to step 2110.

In step 2110, it is determined whether the empty queue indicator is set. In various embodiments, the interrupt manager 1040 determines whether the empty queue indicator 1310 of the interrupt vector state 1125 is set. If the empty queue indicator 1310 is set, the portion of the method 1700 proceeds to step 2135. Otherwise, the portion of the method 1700 proceeds to step 2115.

In step 2115, arrived at from the determination in step 2110 that the empty queue indicator is not set, it is determined whether the event aggregation threshold is reached. In various embodiments, the interrupt manager 1040 determines whether the aggregate event count 1320 has reached an event aggregation threshold. For example, the interrupt manager 1040 may determine whether the aggregate event count 1320 has reached the event aggregation threshold 1610 in the configuration register 1130 associated with the interrupt vector state 1125. If the aggregate event count 1320 has reached the event aggregation threshold 1610, the portion of the method 1700 proceeds to step 2120. Otherwise, the portion of the method 1700 proceeds to step 2130.

In step 2120, arrived at from the determination in step 2115 that the event aggregation threshold is reached, the interrupt status is set. In various embodiments, the interrupt manager 1040 sets the interrupt status 1330 of the interrupt vector state 1125 to indicate the interrupt status 1330 is pending. For example, the interrupt manager 1040 may set the interrupt status 1330 of the interrupt vector state 1125 to the pending state. The portion of the method 1700 then proceeds to step 2125.

In step 2125, the aggregate event count is cleared. In various embodiments, the interrupt manager 1040 clears the aggregate event count 1320 of the interrupt vector state 1125. The portion of the method 1700 then proceeds to step 2130.

In step 2135, arrived at from the determination in step 2110 that the empty queue indicator is set, the aggregate event count is cleared. In various embodiments, the interrupt manager 1040 clears the aggregate event count 1320 of the interrupt vector state 1125. The portion of the method 1700 then proceeds to step 2140.

In step 2140, the interrupt status of the interrupt vector state is cleared. In various embodiments, the interrupt manager 1040 clears the interrupt status 1330 of the interrupt vector state 1125. The portion of the method 1700 then proceeds to step 2130.

In step 2130, arrived at from the determination in step 2115 that the event aggregation threshold is not reached, step 2125 in which the aggregate event count is cleared, or step 2140 in which the interrupt status is cleared, the empty queue indicator of the interrupt vector state 1125 is set. In various embodiments, the interrupt manager 1040 sets the empty queue indicator 1310 of the interrupt vector state 1125. In this way, the interrupt manager 1040 initializes the empty queue indicator 1310. The portion of the method 1700 then proceeds to step 2145.

In step 2145, it is determined whether an additional interrupt vector state is to be processed. In various embodiments, the interrupt manager 1040 determines whether an additional interrupt vector state 1125 is to be processed. If an additional interrupt vector state 1125 is to be processed, the portion of the method 1700 returns to step 2105. Otherwise, the portion of the method 1700 ends.

In various embodiments, the portion of the method 1700 illustrated in FIG. 21 may include more or fewer than the steps 2105-2145 illustrated in FIG. 21 and described above. In some embodiments, the steps 2105-2145 of the portion of the method 1700 illustrated in FIG. 21 may be performed in a different order than the order illustrated in FIG. 21 and described above. In some embodiments, some of the steps 2105-2145 of the portion of the method 1700 illustrated in FIG. 21 may be performed in parallel or substantially simultaneously. In various embodiments, one or more of the steps 2105-2145 may be performed more than once in the portion of the method 1700 illustrated in FIG. 21.

In various embodiments, the portion of the method 1700 illustrated in FIG. 20 and the portion of the method 1700 illustrated in FIG. 21 are performed substantially simultaneously (e.g., in parallel) in the method 1700. In these embodiments, the interrupt manager 1040 performs time based aggregation and completion queue event based aggregation for determining whether to generate an interrupt message packet for a completion queue 525 associated with an interrupt vector state 1125.

Figure 22:
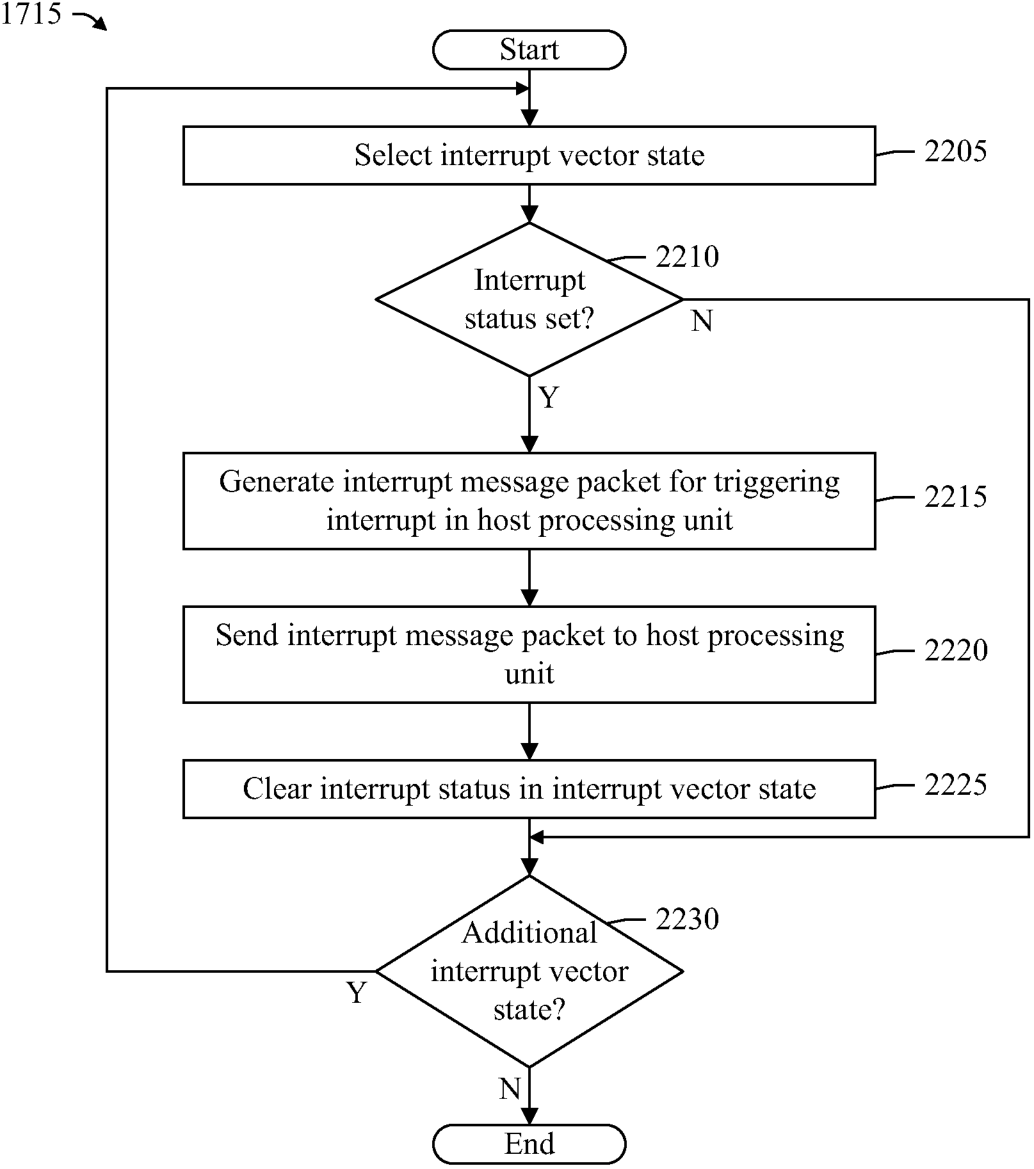
FIG. 22 is a flow chart for a portion of a method of alerting a host processing unit of an unprocessed completion status, in accordance with an embodiment of the present invention.

FIG. 22 illustrates a portion of the method 1700 of alerting a host processing unit of an unprocessed completion status, in accordance with an embodiment of the present invention. The portion of the method 1700 illustrated in FIG. 20 illustrates embodiments of the step 1715 illustrated in FIG. 17 and FIG. 18.

In step 2205, an interrupt vector state is selected. In various embodiments, the interrupt manager 1040 selects the interrupt vector state 1125. For example, the interrupt manager 1040 may select a completion queue state 1115 for processing based on a predetermined selection order. The portion of the method 1700 then proceeds to step 2210.

In step 2210, it is determined whether the interrupt status of the interrupt vector state is set. In various embodiments, the interrupt manager 1040 in the host controller interface 120 of the nonvolatile memory controller 105 determines whether the interrupt status 1330 is set in the interrupt vector state 1125 (i.e., the selected interrupt vector state 1125). For example, the interrupt manager 1040 may determine the interrupt status 1330 of the interrupt vector state 1125 is set by determining the interrupt status 1330 is in the pending state. In this way, the interrupt manager 1040 determines whether the completion queue 525 in the host processing unit 110 associated with the interrupt vector state 1125 contains one or more unprocessed completion statuses. If the interrupt status 1330 of the interrupt vector state 1125 is set, the portion of the method 1700 proceeds to step 2215. Otherwise, the portion of the method 1700 proceeds to step 2230.

In step 2215, arrived at from the determination in step 2210 that the interrupt status of the interrupt vector state is set, an interrupt message packet is generated for triggering an interrupt in the host processing unit to alert the host processing unit of the unprocessed completion status in the completion queue. In various embodiments, the interrupt manager 1040 generates the interrupt message packet for generating an interrupt in the host processing unit 110. The interrupt in the host processing unit 110 is associated with an interrupt vector in the host processing unit 110. Moreover, the interrupt vector is associated with the completion queue 525 associated with the interrupt vector state 1125 in which the interrupt status 1330 is set. The portion of the method 1700 then proceeds to step 2220.

In step 2220, the interrupt message packet is sent to the host processing unit. In various embodiments, the interrupt manager 1040 sends the interrupt message packet to the host processing unit 110. In this way, the interrupt manager 1040 alerts the host processing unit 110 of the unprocessed completion status in the completion queue 525 associated with the interrupt. The portion of the method 1700 then proceeds to step 2225.

In step 2225, the interrupt status is cleared in the interrupt vector state 1125. In various embodiments, the interrupt manager 1040 clears the interrupt status 1330 in the interrupt vector state 1125. The portion of the method 1700 then proceeds to step 2330.

In step 2230, arrived at from the determination in step 2210 that the interrupt status is not set or from step 2225 in which the interrupt status is cleared, it is determined whether an additional interrupt vector state is to be processed. In various embodiments, the interrupt manager 1040 in the host controller interface 120 of the nonvolatile memory controller 105 determines whether an additional interrupt vector state 1125 is to be processed. If an additional interrupt vector state 1125 is to be processed, the portion of the method 1700 returns to step 2205. Otherwise, the portion of the method 1700 ends.

In various embodiments, the portion of the method 1700 illustrated in FIG. 22 may include more or fewer than the steps 2205-2230 illustrated in FIG. 22 and described above. In some embodiments, the steps 2205-2230 of the portion of the method 1700 illustrated in FIG. 22 may be performed in a different order than the order illustrated in FIG. 22 and described above. In some embodiments, some of the steps 2205-2230 of the portion of the method 1700 illustrated in FIG. 22 may be performed in parallel or substantially simultaneously. In various embodiments, one or more of the steps 2205-2230 may be performed more than once in the portion of the method 1700 illustrated in FIG. 22.

Although the invention has been described with reference to particular embodiments thereof, it will be apparent to one of ordinary skill in the art that modifications to the described embodiment may be made without departing from the spirit of the invention. Accordingly, the scope of the invention will be defined by the attached claims not by the above detailed description.

What is claimed is:

1. A nonvolatile memory controller for alerting a host processing unit to an unprocessed completion status contained in a completion queue of the host processing unit, the nonvolatile memory controller comprising:

an interrupt manager configured to generate a completion queue state for indicating the occurrence of a completion queue event associated with the completion queue, generate an interrupt vector state based on the completion queue state, determine the completion queue of the host processing unit contains an unprocessed completion status based on the interrupt vector state, and generate an interrupt message packet for triggering an interrupt in the host processing unit to alert the host processing unit of the unprocessed completion status in the completion queue, and wherein the completion queue state includes a doorbell update status indicating whether the host processing unit has performed a doorbell update event in which the host processing unit updates a head pointer stored in the nonvolatile memory controller for the completion queue.

2. The nonvolatile memory controller of claim 1, wherein the interrupt is a hardware interrupt.

3. The nonvolatile memory controller of claim 1, wherein the interrupt message packet includes an interrupt vector associated with the completion queue for triggering the interrupt in the host processing unit.

4. The nonvolatile memory controller of claim 3, wherein completion queue state includes an event count indicating a number of completion message packets received by the host controller interface for the completion queue associated with the completion queue state.

5. The nonvolatile memory controller of claim 4, wherein the interrupt vector state includes an aggregate event count for aggregating event counts of the completion queue state over a plurality of update operations, and wherein the interrupt manager is inhibited from generating an interrupt message packet if the aggregate event count is below an aggregate event count threshold.

6. The nonvolatile memory controller of claim 3, wherein the interrupt vector state includes an aggregate time indicator for indicating, a time period between the last time the interrupt manager generated an interrupt message packet for the completion queues associated with the interrupt vector state.

7. The nonvolatile memory controller of claim 3, wherein the completion queue state includes an empty queue indicator for indicating whether the completion queue is empty, and wherein the interrupt manager is inhibited from generating an interrupt message packet if the empty queue indicator indicates the completion queue is empty.

8. A nonvolatile memory controller comprising:

a completion queue state memory configured to store a plurality of completion queue states corresponding to a plurality of completion queues in a host processing unit;

an interrupt vector state memory configured to store a plurality of interrupt vector states corresponding to a plurality of interrupt vectors in the host processing unit; and an interrupt manager controller coupled to the completion queue state memory and the interrupt vector state memory, the interrupt manager controller configured to map at least one completion queue state of the plurality of completion queue states to an interrupt vector state of the plurality of interrupt vector states, generate the interrupt vector state based on each completion queue state mapped to the interrupt vector state, determine a completion queue corresponding to a completion queue state mapped to the interrupt vector state contains an unprocessed completion status based on the interrupt vector state, and to generate an interrupt message packet based on the interrupt vector state for triggering an interrupt in the host processing unit to alert the host processing unit of the unprocessed completion status in the completion queue.

9. The nonvolatile memory controller of claim 8, wherein the interrupt manager controller is configured to map at least two completion queue states of the plurality of completion queue states to the interrupt vector state.

10. The nonvolatile memory controller of claim 8, wherein the interrupt manager controller is a sequential logic circuit.

11. The nonvolatile memory controller of claim 8, wherein a completion queue state of the plurality of completion queue states includes a doorbell update status indicating whether the host processing unit has performed a doorbell update event in which the host processing unit updates a head pointer stored in the nonvolatile memory controller for the completion queue.

12. The nonvolatile memory controller of claim 8, wherein a completion queue state of the plurality of completion queue states includes an event count indicating a number of completion message packets received by a host controller interface and including a completion status for the completion queue associated with the completion queue state.

13. The nonvolatile memory controller of claim 12, wherein the interrupt vector state includes an aggregate event count for aggregating event counts of the completion queue state over a plurality of update operations, and wherein the interrupt manager is inhibited from generating an interrupt message packet if the aggregate event count is below an aggregate event count threshold.

14. The nonvolatile memory controller of claim 8, wherein the interrupt vector state includes an aggregate time indicator for indicating a time period between the last time the interrupt manager generated an interrupt message packet for the completion queues associated with the interrupt vector state, and wherein the interrupt manager is inhibited from generating an interrupt message packet if the aggregate time indicator is below an aggregate time threshold.

15. The nonvolatile memory controller of claim 8, wherein a completion queue state of the plurality of completion queue states includes an empty queue indicator for indicating whether the completion queue is empty, and wherein the interrupt manager is inhibited from generating an interrupt message packet if the empty queue indicator indicates the completion queue is empty.

16. A method comprising:

generating a completion queue state by a nonvolatile memory controller for indicating the occurrence of a completion queue event associated with a completion queue in a host processing unit, the completion queue state including a doorbell update status indicating whether the host processing unit has performed a doorbell update event in which the host processing unit updates a head pointer stored in the nonvolatile memory controller for the completion queue;

generating an interrupt vector state by the nonvolatile memory controller based on the completion queue state, the interrupt vector state associated with an interrupt vector in the host processing unit;

determining by the nonvolatile memory controller based on the interrupt vector state that the completion queue contains an unprocessed completion status; and generating an interrupt message packet by a nonvolatile memory interface for triggering an interrupt in the host processing unit to alert the host processing unit of the unprocessed completion status in the completion queue.

17. The method of claim 16, further comprising sending the interrupt message packet to the host processing unit.

18. The method of claim 16, wherein the completion queue event is the host processing unit updating a head pointer stored in the nonvolatile memory controller for the completion queue.

19. The method of claim 16, wherein the completion queue event is detecting a completion queue event flag set in a completion message packet containing a completion status.

* * * * *